US012331205B2

(12) United States Patent
Sato et al.

(10) Patent No.: US 12,331,205 B2
(45) Date of Patent: Jun. 17, 2025

(54) RESIN PARTICLE DISPERSION

(71) Applicant: KAO CORPORATION, Tokyo (JP)

(72) Inventors: Takahiro Sato, Wakayama (JP); Hirotaka Takeno, Wakayama (JP)

(73) Assignee: KAO CORPORATION, Tokyo (JP)

( * ) Notice: Subject to any disclaimer, the term of this patent is extended or adjusted under 35 U.S.C. 154(b) by 627 days.

(21) Appl. No.: 17/779,405

(22) PCT Filed: Nov. 16, 2020

(86) PCT No.: PCT/JP2020/042657
§ 371 (c)(1),
(2) Date: May 24, 2022

(87) PCT Pub. No.: WO2021/106656
PCT Pub. Date: Jun. 3, 2021

(65) Prior Publication Data
US 2022/0403191 A1    Dec. 22, 2022

(30) Foreign Application Priority Data
Nov. 28, 2019  (JP) .................................. 2019-215512

(51) Int. Cl.
*C09D 11/107* (2014.01)
*C08F 220/18* (2006.01)
*C08F 220/56* (2006.01)
*C09D 11/037* (2014.01)
*C09D 11/322* (2014.01)
*C09D 151/00* (2006.01)

(52) U.S. Cl.
CPC .......... *C09D 11/107* (2013.01); *C08F 220/18* (2013.01); *C08F 220/56* (2013.01); *C09D 11/037* (2013.01); *C09D 11/322* (2013.01); *C09D 151/003* (2013.01); *C08F 2500/27* (2021.01); *C08F 2500/32* (2021.01); *C08F 2800/20* (2013.01)

(58) Field of Classification Search
CPC .... C08F 220/18; C08F 220/52; C08F 220/54; C08F 220/56; C08F 220/1804; C08F 265/04; C08F 265/06; C08L 2207/53; C09D 11/037; C09D 11/107; C09D 151/003
See application file for complete search history.

(56) References Cited

U.S. PATENT DOCUMENTS

2004/0059022 A1    3/2004 Tsukiyama et al.
2017/0166767 A1*   6/2017 Watanabe ............ C09D 11/322

FOREIGN PATENT DOCUMENTS

| CN | 1492886 A | 4/2004 | |
|---|---|---|---|
| CN | 1715346 A * | 1/2006 | ............ C08F 259/02 |
| CN | 103601837 A | 2/2014 | |
| CN | 114787212 B * | 5/2024 | ............ C08F 220/18 |
| EP | 0 434 388 A2 | 6/1991 | |
| EP | 4067398 B1 * | 10/2024 | ............ C08F 220/18 |
| JP | 2003-213152 A | 7/2003 | |
| JP | 2003-295420 A | 10/2003 | |
| JP | 2004-154982 A | 6/2004 | |
| JP | 2005-336399 A | 12/2005 | |
| JP | 2006-206665 A | 8/2006 | |
| JP | 2007-161600 A | 6/2007 | |
| JP | 2011-12173 A | 1/2011 | |
| JP | 2014-205816 A | 10/2014 | |
| JP | 2019-116535 A | 7/2019 | |
| JP | 7304276 B2 * | 7/2023 | ............ C08F 220/18 |
| WO | WO 2018/180284 A1 | 10/2018 | |

OTHER PUBLICATIONS

International Search Report issued Jan. 19, 2021, in PCT/JP2020/042657 filed Nov. 16, 2020, 3 pages.

* cited by examiner

*Primary Examiner* — Sophie Hon
(74) *Attorney, Agent, or Firm* — Oblon, McClelland, Maier & Neustadt, L.L.P.

(57) ABSTRACT

A resin particle dispersion containing core/shell-type resin particles and water is described. A shell portion resin of the core/shell-type resin particles contains a constitutional unit derived from a (meth)acrylic acid ester containing a hydrocarbon group having from 4 to 8 carbon atoms. A core portion resin of the core/shell-type resin particles contains a constitutional unit derived from a (meth)acrylamide-based monomer whose solubility parameter lies within the range of from 17.0 to 21.0 $(J/cm^3)^{0.5}$ in an amount of not less than 5% by mass, and a glass transition temperature of the core portion resin is not higher than 50° C. An acid value of the core/shell-type resin particles is from 50 to 100 mgKOH/g. A process for producing the resin particle dispersion and a printing method using the resin particle dispersion is also described.

19 Claims, No Drawings

RESIN PARTICLE DISPERSION

CROSS-REFERENCE TO RELATED APPLICATIONS

The present application is a 35 U.S.C. § 371 national stage application of International patent application PCT/JP2020/042657, filed Nov. 16, 2020, which is based on and claims the benefit of priority to Japanese Application No. 2019-215512, filed Nov. 28, 2019. The entire contents of these applications are incorporated herein by reference.

FIELD OF THE INVENTION

The present invention relates to a resin particle dispersion, a process for producing the resin particle dispersion, and a printing method using the resin particle dispersion.

BACKGROUND OF THE INVENTION

Under the recent circumstances surrounding printing industries in which high consciousness for improving working environments, printing environments and workplace environments tends to be raised, from the standpoint of low-odor properties, safety, etc., it has been demanded to provide a water-soluble ink using water as a main solvent. On the other hand, it has also been demanded to further improve printing performance.

In addition, there is an increasing demand for not only printing techniques using a conventional printing paper substrate having a white ground, but also white printing techniques using a printing substrate having a non-white ground, such as a corrugated board, a paper board, a resin film, etc. As the resin film substrate used in these printing techniques, there has been frequently employed a polyolefin resin film, a polyester resin film or the like. In particular, it has been required that inks used for the printing are improved in coating film properties, such as substrate-adhesion properties against the polyolefin resin film substrate, etc.

Moreover, in recent years, it has been required not only to meet requirements such as saving of energy, reduction of burden on the environments, etc., but also to reduce an amount of plastics used in life in view of the problems concerning marine contamination by plastic garbage. Therefore, it has also become predominant to use a thin resin film substrate in the printing.

In the case of conducting the printing on a substrate having a non-white ground, a white ink is used for the purpose of expressing a white color or enhancing visibility of printed images. As a pigment for the white ink, titanium oxide having high hiding power has been generally used. However, an aqueous ink containing the titanium oxide, etc., tends to suffer from problems such as deteriorated adhesion of the ink to the substrate.

The aqueous ink composition used above generally contains a pigment, a polymer and water in which the polymer is added as a dispersant or a binder for the pigment for the purpose of improving coating film properties of the ink on a printed material. As the binder, there have been used rein particles obtained by an emulsion polymerization method or a phase inversion emulsification method. In addition, the resin particles may be used in the form of core/shell-type resin particles in some cases to allow them to exhibit various functions.

For example, JP 2014-205816A (Patent Literature 1) aims at providing a dispersion of core/shell-type resin fine particles which is capable of exhibiting excellent coating film properties against a resin film substrate, and an aqueous ink composition containing the dispersion which can be used for gravure printing, etc., and discloses a dispersion of core/shell-type resin fine particles for an aqueous ink having a specific average particle size and a specific Tg, which is produced by polymerizing an ethylenically unsaturated monomer in an aqueous medium in the presence of a water-soluble resin and in which the water-soluble resin is obtained by polymerizing an aromatic ethylenically unsaturated monomer and a carboxy group-containing ethylenically unsaturated monomer, and also discloses an aqueous ink composition.

JP 2019-116535A (Patent Literature 2) aims at providing a resin particle dispersion that can be used as an aqueous ink having excellent substrate-adhesion properties, etc., and discloses a core/shell-type resin particle dispersion in which core/shell-type resin particles whose core portion contains a specific amount of a constitutional unit derived from a specific (meth)acrylic acid ester and which have a specific acid value are used in combination with a specific glycol ether.

SUMMARY OF THE INVENTION

The present invention relates to a resin particle dispersion containing core/shell-type resin particles (A) and water, in which:

a shell portion resin of the core/shell-type resin particles (A) contains a constitutional unit derived from a (meth) acrylic acid ester (a-1) containing a hydrocarbon group having not less than 4 and not more than 8 carbon atoms;

a core portion resin of the core/shell-type resin particles (A) contains a constitutional unit derived from a (meth) acrylamide-based monomer (b-1) whose solubility parameter lies within the range of not less than 17.0 $(J/cm^3)^{0.5}$ and not more than 21.0 $(J/cm^3)^{0.5}$ in an amount of not less than 5% by mass;

a glass transition temperature of the core portion resin is not higher than 50° C.; and an acid value of the core/shell-type resin particles (A) is not less than 50 mgKOH/g and not more than 100 mgKOH/g.

DETAILED DESCRIPTION OF THE INVENTION

The aqueous ink has been required to exhibit good printability on various resin film substrates, high versatility and excellent substrate-adhesion properties. In the Patent Literatures 1 and 2, it is described that the inks can be improved in adhesion to a polyolefin resin film substrate by compounding the core/shell-type resin particles therein.

However, when conducting the printing on a low-water absorbing printing substrate such as a resin film, etc., in particular, a very thin printing substrate having, for example, a thickness of not more than 100 μm which tends to readily suffer from deformation owing to poor rigidity (stiffness) thereof, the inks tend to become more insufficient in adhesion properties to such a printing substrate as the thickness of the printing substrate is reduced. Therefore, it has been required that the conventional inks are further improved in the substrate-adhesion properties.

The present invention relates to a resin particle dispersion capable of providing a printed material that is excellent in substrate-adhesion properties even when conducting the printing on a low-water absorbing printing substrate that tends to readily suffer from deformation owing a very small thickness thereof, a process for producing the resin particle dispersion, and a printing method using the resin particle dispersion.

The present inventors have found that by using a dispersion containing core/shell-type resin particles in which a shell portion resin present in an outer core of the core/shell-type resin particles contains a constitutional unit derived from a (meth)acrylic acid ester containing a hydrocarbon group having a specific number of carbon atoms, and a core portion resin present in an inner core of the core/shell-type resin particles contains a specific amount of a constitutional unit derived from a (meth)acrylamide-based monomer whose solubility parameter lies within a specific range, and further in which a glass transition temperature of the core portion resin is adjusted to not more than a specific value, and an acid value of the core/shell-type resin particles is adjusted to a specific range, it is possible to provide a resin particle dispersion capable of providing a printed material that is excellent in substrate-adhesion properties even when conducting the printing on a low-water absorbing printing substrate that tends to readily suffer from deformation owing a very small thickness thereof, a process for producing the resin particle dispersion, and a printing method using the resin particle dispersion.

That is, the present invention relates to the following aspects [1] to [3].

[1] A resin particle dispersion containing core/shell-type resin particles (A) and water, in which:
- a shell portion resin of the core/shell-type resin particles (A) contains a constitutional unit derived from a (meth)acrylic acid ester (a-1) containing a hydrocarbon group having not less than 4 and not more than 8 carbon atoms;
- a core portion resin of the core/shell-type resin particles (A) contains a constitutional unit derived from a (meth)acrylamide-based monomer (b-1) whose solubility parameter lies within the range of not less than 17.0 $(J/cm^3)^{0.5}$ and not more than 21.0 $(J/cm^3)^{0.5}$ in an amount of not less than 5% by mass;
- a glass transition temperature of the core portion resin is not higher than 50° C.; and
- an acid value of the core/shell-type resin particles (A) is not less than 50 mgKOH/g and not more than 100 mgKOH/g.

[2] A process for producing the resin particle dispersion according to the aforementioned aspect [1], including:
Step I of subjecting a core portion resin monomer material for forming the core portion resin to polymerization reaction in the presence of an emulsion of a shell polymer forming the shell portion resin to form the core/shell-type resin particles (A) and thereby obtain the resin particle dispersion.

[3] A printing method including the step of printing characters or images on a resin film as a printing substrate using the resin particle dispersion according to the aforementioned aspect [1].

In accordance with the present invention, it is possible to provide a resin particle dispersion capable of providing a printed material that is excellent in substrate-adhesion properties even when conducting the printing on a low-water absorbing printing substrate that tends to readily suffer from deformation owing a very small thickness thereof, a process for producing the resin particle dispersion, and a printing method using the resin particle dispersion.

[Resin Particle Dispersion]

The resin particle dispersion of the present invention is characterized by containing core/shell-type resin particles (A) (hereinafter also referred to merely as "resin particles (A)") and water, in which a shell portion resin present in an outer core of the core/shell-type resin particles (A) contains a constitutional unit derived from a (meth)acrylic acid ester (a-1) containing a hydrocarbon group having not less than 4 and not more than 8 carbon atoms; a core portion resin present in an inner core of the core/shell-type resin particles (A) contains a constitutional unit derived from a (meth)acrylamide-based monomer (b-1) whose solubility parameter (hereinafter also referred to merely as an "SP value") lies within the range of not less than 17.0 $(J/cm^3)^{0.5}$ and not more than 21.0 $(J/cm^3)^{0.5}$ in an amount of not less than 5% by mass; a glass transition temperature of the core portion resin is not higher than 50° C.; and an acid value of the core/shell-type resin particles (A) is not less than 50 mgKOH/g and not more than 100 mgKOH/g.

The term "(meth)acrylic acid ester" as used in the present invention means an acrylic acid ester and/or a methacrylic acid ester.

The resin particle dispersion of the present invention may be used as an aqueous ink that is excellent in substrate-adhesion properties. Moreover, by incorporating a pigment, etc., into the resin particle dispersion, the resulting dispersion may also be used as an aqueous ink for printing, in particular, for gravure printing. In addition, the resin particle dispersion of the present invention may also be used as a clear ink in the case where no pigment is compounded therein.

The resin particle dispersion of the present invention has the effect of providing a printed material that is excellent in substrate-adhesion properties. The reason why the aforementioned advantageous effect can be attained by the present invention is considered as follows, though it is not clearly determined yet.

That is, the core/shell-type resin particles having an adequate acid value are capable of imparting good stability to the ink owing to an electrostatic repulsion force thereof. In addition, since the shell portion resin present in an outer core of the core/shell-type resin particles contains the constitutional unit derived from the (meth)acrylic acid ester containing a hydrocarbon group having not less than 4 and not more than 8 carbon atoms and the glass transition temperature of the core portion resin present in an inner core of the core/shell-type resin particles is adjusted to not higher than 50° C., it is considered that the resulting ink can be improved in adhesion to a substrate such as a resin film, etc. Furthermore, since the resin particles have a core/shell structure having an adequate flexibility, it is considered that the resulting ink can be improved in followability to physical deformation of the substrate and therefore can exhibit a constant peel strength.

In general, in the case of using a substrate having a large thickness, a coating film of the ink printed on the substrate tends to hardly undergo occurrence of a strong peel stress therein. However, in the case of using a substrate having a very small thickness, a coating film of the ink printed on such a substrate tends to undergo occurrence of a strong peel stress therein.

In the present invention, it is considered that by further introducing an amide structure into the core portion resin of the aforementioned core/shell-type resin particles to allow them to exhibit strong cohesion force (intermolecular interaction) therebetween and thereby enhance resistance to strong peel force exerted thereto, the resulting ink can be improved in peel strength when using a substrate having a small thickness.

In this case, it is considered that by controlling the SP value of the (meth)acrylamide-based monomer used for introducing an amide structure into the core portion resin to a specific range, when forming the core/shell-type resin particles as described hereinbelow, the monomer can be efficiently absorbed into the shell polymer that constitutes the shell portion resin and has a hydrophobic moiety containing the constitutional unit derived from the (meth)acrylic acid ester containing a hydrocarbon group having not less than 4 and not more than 8 carbon atoms, whereby a predetermined amount of the constitutional unit derived from the (meth)acrylamide-based monomer can be introduced into the core portion resin, so that the resulting ink can be improved in substrate-adhesion properties.

<Core/Shell-Type Resin Particles (A)>

The resin particle dispersion of the present invention contains the core/shell-type resin particles (A).

The core/shell-type resin particles (A) are resin particles having such a structure that the core portion resin is enclosed in the shell portion resin.

Meanwhile, the respective core/shell-type resin particles (A) may be constituted of three or more phases. In this case, among the phases capable of satisfying the aforementioned structure, a resin located in an innermost core of the respective resin particles is defined as the core portion resin, whereas a resin located as an outermost core thereof is defined as the shell portion resin.

(Shell Portion Resin)

The shell portion resin of the core/shell-type resin particles (A) is not particularly limited as long as it contains a constitutional unit derived from a (meth)acrylic acid (a-1) containing a hydrocarbon group having not less than 4 and not more than 8 carbon atoms. Examples of the shell portion resin include condensation-based resins, such as polyesters, polyurethanes, etc.; vinyl-based polymers; and the like.

Among these resins, from the viewpoint of improving substrate-adhesion properties of the resulting ink, the shell portion resin is preferably a vinyl-based polymer obtained by addition-polymerizing a vinyl monomer (such as a vinyl compound, a vinylidene compound and a vinylene compound), and more preferably an acrylic polymer. The vinyl-based polymer may be either an appropriately synthesized product or a commercially available product.

The shell portion resin is preferably a water-insoluble polymer, and more preferably a water-insoluble polymer having a self-emulsifiability. In particular, in the case of using, as a printing substrate, a resin film substrate having a polar group on a surface thereof by subjecting the substrate to surface treatments, such as a corona discharge-treated biaxially oriented polypropylene film, the water-insoluble polymer preferably contains an anionic group from the viewpoint of improving substrate-adhesion properties of the resulting ink.

The glass transition temperature of the shell portion resin is preferably not lower than 40° C., more preferably not lower than 50° C., even more preferably not lower than 60° C. and further even more preferably not lower than 70° C., and is also preferably not higher than 180° C., more preferably not higher than 150° C., even more preferably not higher than 130° C. and further even more preferably not higher than 110° C., from the viewpoint of improving anti-blocking properties of a printed material obtained after the printing. The aforementioned glass transition temperature may be calculated from mass fractions of the monomers constituting the shell portion resin and the values of glass transition temperatures of homopolymers of the respective monomer components according to the Fox equation.

The acid value of the shell portion resin is preferably not less than 100 mgKOH/g, more preferably not less than 120 mgKOH/g, even more preferably not less than 150 mgKOH/g and further even more preferably not less than 170 mgKOH/g, and is also preferably not more than 280 mgKOH/g, more preferably not more than 260 mgKOH/g, even more preferably not more than 250 mgKOH/g and further even more preferably not more than 200 mgKOH/g, from the viewpoint of improving substrate-adhesion properties of the resulting ink.

The acid value of the shell portion resin may be calculated from a mass ratio between the respective monomers constituting the shell portion resin.

In the case where the shell portion resin is formed of the vinyl-based polymer, in particular, the acrylic polymer, it is preferred that the shell portion resin further contains a constitutional unit derived from an ionic monomer (a-2). The shell portion resin may also contain a constitutional unit derived from a hydrophobic monomer (a-3) other than the (meth)acrylic acid ester (a-1) and a constitutional unit derived from a hydrophilic nonionic monomer (a-4).

The shell portion resin may be obtained, for example, by subjecting a shell portion resin monomer material containing the (meth)acrylic acid ester (a-1) and, if required, further containing at least one monomer selected from the group consisting of the ionic monomer (a-2), the hydrophobic monomer (a-3) and the hydrophilic nonionic monomer (a-4), to addition polymerization by conventionally known methods.

[(Meth)Acrylic Acid Ester (a-1)]

The (meth)acrylic acid ester (a-1) contains a hydrocarbon group having not less than 4 and not more than 8 carbon atoms, and is used as a monomer component of the shell portion resin from the viewpoint of improving dispersion stability of the resin particles (A). As the (meth)acrylic acid ester (a-1), preferred are an alkyl (meth)acrylate, an aromatic group-containing (meth)acrylate and the like, and more preferred is an alkyl (meth)acrylate.

The alkyl (meth)acrylate includes those alkyl (meth)acrylates containing an alkyl group preferably having not less than 4 and not more than 8 carbon atoms and more preferably not less than 4 and not more than 6 carbon atoms. Examples of the alkyl (meth)acrylate include (iso- or tert-) butyl (meth)acrylate, (iso)amyl (meth)acrylate, cyclohexyl (meth)acrylate, 2-ethylhexyl (meth)acrylate, (iso)octyl (meth)acrylate, and the like.

Meanwhile, the terms "(iso- or tert-)" and "(iso)" as used herein mean both of the structure in which any of the groups expressed by "iso- or tert-" and "iso" is present, and the structure in which any of these groups is not present (i.e., normal). In addition, the term "(meth)acrylate" as used herein means an acrylate and/or a methacrylate.

As the aromatic group-containing (meth)acrylate, preferred is at least one compound selected from the group consisting of benzyl (meth)acrylate and phenoxyethyl (meth)acrylate, etc., and more preferred is benzyl (meth) acrylate.

[Ionic Monomer (a-2)]

The ionic monomer (a-2) is used as a monomer component of the shell portion resin from the viewpoint of improving dispersion stability of the resin particles (A).

Examples of the ionic monomer (a-2) include an anionic monomer and a cationic monomer. Among these ionic monomers, preferred is an anionic monomer.

Examples of the anionic monomer include a carboxylic acid monomer, a sulfonic acid monomer, a phosphoric acid monomer, and the like.

Among the aforementioned anionic monomers, from the viewpoint of improving dispersion stability of the resin particles (A), preferred is a carboxy group-containing carboxylic acid monomer, more preferred are acrylic acid, methacrylic acid, crotonic acid, itaconic acid, maleic acid, fumaric acid, citraconic acid, 2-methacryloyloxymethylsuccinic acid, etc., and even more preferred is at least one monomer selected from the group consisting of acrylic acid and methacrylic acid.

Examples of the cationic monomer include N,N-dimethylaminoethyl methacrylate, N,N-dimethylaminoethyl acrylamide, etc.

Meanwhile, the ionic monomer (a-2) may also include those monomers that have no ionicity under neutral conditions, but are converted into ions under acid or alkaline conditions, such as acids, amines, etc.

[Hydrophobic Monomer (a-3)]

The hydrophobic monomer (a-3) other than the (meth)acrylic acid ester (a-1) may be used as a monomer component of the shell portion resin from the viewpoint of improving dispersion stability of the resin particles (A). Examples of the hydrophobic monomer (a-3) include an alkyl (meth)acrylate and a styrene-based monomer which are monomers other than the (meth)acrylic acid ester (a-1), etc.

Examples of the alkyl (meth)acrylate other than the (meth)acrylic acid ester (a-1) include methyl (meth)acrylate, ethyl (meth)acrylate, (iso)propyl (meth)acrylate, (iso)decyl (meth)acrylate, (iso)dodecyl (meth)acrylate, (iso)stearyl (meth)acrylate, and the like.

As the styrene-based monomer, preferred is at least one monomer selected from the group consisting of styrene, 2-methyl styrene and divinyl benzene, etc., and more preferred is styrene.

[Hydrophilic Nonionic Monomer (a-4)]

The hydrophilic nonionic monomer (a-4) can be used as a monomer component of the shell portion resin from the viewpoint of improving dispersion stability of the resin particles (A).

Examples of the hydrophilic nonionic monomer (a-4) include hydroxyalkyl (meth)acrylates, such as 2-hydroxyethyl (meth)acrylate, 3-hydroxypropyl (meth)acrylate, etc.; polyalkylene glycol (meth)acrylates, such as polypropylene glycol (n=2 to 30 in which n represents an average molar number of addition of oxyalkylene groups: hereinafter defined in the same way) (meth)acrylate, polyethylene glycol (n=2 to 30) (meth)acrylate, etc.; alkoxy polyalkylene glycol (meth)acrylates, such as methoxy polyethylene glycol (n=1 to 30) (meth)acrylate, octoxy polyethylene glycol (n=1 to 30) (meth)acrylate, etc.; phenoxy (ethylene glycol/propylene glycol copolymer) (n=1 to 30 in which n for ethylene glycol: n=1 to 29) (meth)acrylate; and the like.

Specific examples of commercially available products of the hydrophilic nonionic monomer (a-4) include "NK ESTER M-20G", "NK ESTER M-40G", "NK ESTER M-90G", "NK ESTER M-230G" and the like as products available from Shin-Nakamura Chemical Co., Ltd.; and "BLEMMER PE-90", "BLEMMER PE-200", "BLEMMER PE-350" and the like, "BLEMMER PME-100", "BLEMMER PME-200", "BLEMMER PME-400" and the like, "BLEMMER PP-500", "BLEMMER PP-800", "BLEMMER PP-1000" and the like, "BLEMMER AP-150", "BLEMMER AP-400", "BLEMMER AP-550" and the like, and "BLEMMER 50PEP-300", "BLEMMER 50POEP-800B", "BLEMMER 43PAPE-600B" and the like as products available from NOF Corporation.

The aforementioned monomer components of the shell portion resin may be respectively used alone or in combination of any two or more thereof.

The shell portion resin may also contain a constitutional unit(s) derived from monomer(s) other than the aforementioned monomer components unless the advantageous effects of the present invention are adversely affected by inclusion thereof.

(Contents of Respective Components in Shell Portion Resin Monomer Material or Contents of Respective Constitutional Units in Shell Portion Resin)

Upon production of the shell portion resin, the contents of the respective components in the shell portion resin monomer material (contents of non-neutralized components; hereinafter defined in the same way), or the contents of the constitutional units derived from the respective components in the shell portion resin are as follows from the viewpoint of improving substrate-adhesion properties of the resulting ink.

The content of the (meth)acrylic acid ester (a-1) is preferably not less than 40% by mass, more preferably not less than 50% by mass and even more preferably not less than 60% by mass, and is also preferably not more than 95% by mass, more preferably not more than 90% by mass and even more preferably not more than 85% by mass.

The content of the ionic monomer (a-2) is preferably not less than 5% by mass, more preferably not less than 10% by mass and even more preferably not less than 15% by mass, and is also preferably not more than 60% by mass, more preferably not more than 50% by mass and even more preferably not more than 40% by mass.

The total content of the (meth)acrylic acid ester (a-1) and the ionic monomer (a-2) is preferably not less than 70% by mass, more preferably not less than 80% by mass, even more preferably not less than 90% by mass and further even more preferably not less than 95% by mass, and is also preferably not more than 100% by mass, and furthermore preferably 100% by mass.

(Core Portion Resin)

The core portion resin contains a constitutional unit derived from a (meth)acrylamide-based monomer (b-1) whose SP value lies within the range of not less than 17.0 $(J/cm^3)^{0.5}$ and not more than 21.0 $(J/cm^3)^{0.5}$ from the viewpoint of improving substrate-adhesion properties of the resulting ink.

[(Meth)acrylamide-Based Monomer (b-1)]

The SP value of the (meth)acrylamide-based monomer (b-1) as used in the present invention represents a Hansen solubility parameter (HSP) value which is calculated using a software "Hansen Solubility Parameter in Practice (HSPiP) Version 5.2.02".

The aforementioned SP value of the (meth)acrylamide-based monomer (b-1) is not less than 17.0 $(J/cm^3)^{0.5}$, preferably not less than 17.3 $(J/cm^3)^{0.5}$ and more preferably not less than 17.5 $(J/cm^3)^{0.5}$, and is also not more than 21.0 $(J/cm^3)^{0.5}$, preferably not more than 20.7 $(J/cm^3)^{0.5}$ and more preferably not more than 20.5 $(J/cm^3)^{0.5}$, from the viewpoint of improving substrate-adhesion properties of the resulting ink.

Examples of the (meth)acrylamide-based monomer (b-1) include N-alkyl (meth)acrylamides containing a linear, branched or cyclic alkyl group, such as N-tert-butyl acrylamide (SP value: 20.2), N-tert-octyl acrylamide (SP value: 17.9), N-(2-ethylhexyl) acrylamide (SP value: 19.4), N-n-octyl acrylamide (SP value: 19.8), N-dodecyl acrylamide (SP value: 18.5), N-n-heptyl acrylamide (SP value: 20.3), N-hexyl acrylamide (SP value: 20.6), N-cyclohexyl methacrylamide (SP value: 20.6), etc.; aromatic group-containing (meth)acrylamides, such as N,N-dibenzyl acrylamide (SP value: 20.4), etc.; N-alkoxy methyl (meth)acrylamides, such as N-isobutoxy methyl acrylamide (SP value: 20.8), etc.; and the like.

The unit of the aforementioned SP value is "$(J/cm^3)^{0.5}$."
In addition, the term "(meth)acrylamide" represents an acrylamide and/or a methacrylamide.

These (meth)acrylamide-based monomers (b-1) may be used alone or in combination of any two or more thereof.

Among these (meth)acrylamide-based monomers (b-1), from the viewpoint of improving substrate-adhesion properties of the resulting ink, preferred are N-alkyl (meth)acrylamides containing a linear, branched or cyclic alkyl group, more preferred are N-alkyl acrylamides containing a branched alkyl group, even more preferred are N-alkyl acrylamides containing a branched alkyl group having not less than 4 and not more than 8 carbon atoms, and further even more preferred is at least one compound selected from the group consisting of N-tert-butyl acrylamide and N-tert-octyl acrylamide.

[(Meth)acrylic Acid Ester (b-2)]

The core portion resin preferably further contains a constitutional unit derived from a (meth)acrylic acid ester (b-2) containing a hydrocarbon group having not less than 2 and not more than 18 carbon atoms. The hydrocarbon group having not less than 2 and not more than 18 carbon atoms in the (meth)acrylic acid ester (b-2) may also contain a hetero atom, such as an oxygen atom, a nitrogen atom, etc. The number of carbon atoms in the aforementioned hydrocarbon group in the (meth)acrylic acid ester (b-2) is preferably not less than 3 and more preferably not less than 4, and is also preferably not more than 12 and more preferably not more than 8, from the viewpoint of improving substrate-adhesion properties of the resulting ink.

As the aforementioned hydrocarbon group in the (meth)acrylic acid ester (b-2), preferred are an alkyl group and an aryl group. Examples of the hydrocarbon group include an ethyl group, a propyl group, an isopropyl group, a butyl group, an isobutyl group, a sec-butyl group, a tert-butyl group, a pentyl group, a hexyl group, a heptyl group, an octyl group, a 2-ethylhexyl group, an octadecyl group, a cyclohexyl group, a benzyl group, etc.

Among these hydrocarbon groups in the (meth)acrylic acid ester (b-2), from the viewpoint of improving substrate-adhesion properties of the resulting ink, preferred is at least one group selected from the group consisting of an alkyl group having not less than 3 and not more than 12 carbon atoms and a benzyl group, more preferred is at least one group selected from the group consisting of a butyl group, an isobutyl group, a sec-butyl group, a tert-butyl group, a hexyl group, an octyl group, a 2-ethylhexyl group, an octadecyl group, a cyclohexyl group and a benzyl group, more preferred is at least one group selected from the group consisting of a butyl group, an isobutyl group, a sec-butyl group, a tert-butyl group, a hexyl group, an octyl group, a 2-ethylhexyl group and a benzyl group, and even more preferred is an isobutyl group.

The (meth)acrylic acid ester (b-2) is at least one compound selected from the group consisting of an acrylic acid ester and a methacrylic acid ester. Among these compounds, from the viewpoint of improving substrate-adhesion properties of the resulting ink, preferred is an acrylic acid ester. These (meth)acrylic acid esters (b-2) may be used alone or in combination of any two or more thereof.

The (meth)acrylic acid ester (b-2) containing the hydrocarbon group having not less than 2 and not more than 18 carbon atoms is preferably at least one compound selected from the group consisting of butyl (meth)acrylate, isobutyl (meth)acrylate, sec-butyl (meth)acrylate, tert-butyl (meth)acrylate, hexyl (meth)acrylate, octyl (meth)acrylate, 2-ethylhexyl (meth)acrylate and benzyl (meth)acrylate, more preferably at least one compound selected from the group consisting of isobutyl (meth)acrylate, sec-butyl (meth)acrylate, tert-butyl (meth)acrylate, 2-ethylhexyl (meth)acrylate and benzyl (meth)acrylate, and even more preferably isobutyl (meth)acrylate.

(Contents of Respective Components in Core Portion Resin Monomer Material or Contents of Respective Constitutional Units in Core Portion Resin)

Upon production of the core portion resin, the contents of the respective components in the core portion resin monomer material (contents of non-neutralized components; hereinafter defined in the same way), or the contents of the constitutional units derived from the respective components in the whole constitutional units constituting the core portion resin are as follows from the viewpoint of improving substrate-adhesion properties of the resulting ink.

The content of the (meth)acrylamide-based monomer (b-1) is not less than 5% by mass, preferably not less than 7% by mass and more preferably not less than 10% by mass, and is also preferably not more than 60% by mass, more preferably not more than 50% by mass, even more preferably not more than 40% by mass, further even more preferably not more than 30% by mass and still further even more preferably not more than 20% by mass, from the viewpoint of improving substrate-adhesion properties of the resulting ink.

In the case where the core portion resin contains the constitutional unit derived from the (meth)acrylic acid ester (b-2) containing a hydrocarbon group having not less than 2 and not more than 18 carbon atoms, the content of the (meth)acrylic acid ester (b-2) is preferably not less than 30% by mass, more preferably not less than 40% by mass, even more preferably not less than 50% by mass and further even more preferably not less than 70% by mass, and is also preferably not more than 95% by mass, more preferably not more than 93% by mass and even more preferably not more than 90% by mass.

The total content of the (meth)acrylamide-based monomer (b-1) and the (meth)acrylic acid ester (b-2) is preferably not less than 70% by mass, more preferably not less than 80% by mass, even more preferably not less than 90% by mass and further even more preferably not less than 95% by mass, and is also preferably not more than 100% by mass, and furthermore preferably 100% by mass.

The mass ratio of the (meth)acrylamide-based monomer (b-1) to the (meth)acrylic acid ester (b-2) [(meth)acrylamide-based monomer (b-1)/(meth)acrylic acid ester (b-2)] is preferably not less than 0.01, more preferably not less than 0.03, even more preferably not less than 0.05 and further even more preferably not less than 0.07, and is also preferably not more than 0.5, more preferably not more than 0.3, even more preferably not more than 0.2, further even more preferably not more than 0.15 and still further even more preferably not more than 0.13.

The core portion resin acts as a focus point of a stress in the respective resin particles (A). Therefore, from the viewpoint of relaxing the stress, the glass transition temperature of the core portion resin is not higher than 50° C., preferably not higher than 40° C., more preferably not higher than 35° C., even more preferably not higher than 30° C., further even more preferably not higher than 25° C. and still further even more preferably not higher than 10° C., and is also preferably not lower than −13° C., more preferably not lower than −10° C. and even more preferably not lower than −7° C. The aforementioned glass transition temperature may be calculated from mass fractions of the respective monomers constituting the core portion resin and values of glass transition temperatures of homopolymers of the respective monomer components according to the Fox equation.

The acid value of the core portion resin is preferably not more than 50 mgKOH/g, more preferably not more than 30 mgKOH/g, even more preferably not more than 10 mgKOH/g and further even more preferably 0 mgKOH/g from the viewpoint of improving substrate-adhesion properties of the resulting ink.

The acid value of the core portion resin may be calculated from the mass ratio between the respective monomers constituting the core portion resin.

[Process for Producing Resin Particle Dispersion]

The process for producing the resin particle dispersion according to the present invention preferably includes the step I of subjecting a core portion resin monomer material for forming the core portion resin to polymerization reaction in the presence of an emulsion of a shell polymer forming the shell portion resin to form the core/shell-type resin particles (A) and thereby obtain the resin particle dispersion. In the production process, by subjecting the core portion resin monomer material containing the (meth)acrylamide-based monomer (b-1) whose SP value lies within the specific range to polymerization reaction in the presence of an emulsion of the shell polymer containing the constitutional unit derived from the (meth)acrylic acid ester (a-1) in which the hydrophobic shell polymer acts as seed particles, the core portion resin monomer material is promptly absorbed into an inside of the respective seed particles in the emulsion, and therefore the polymerization reaction of the core portion resin monomer material is allowed to proceed, whereby it is possible to obtain the core/shell-type resin particles (A).

Meanwhile, the shell polymer preferably contains the same constitutional unit as that of the shell portion resin. That is, the shell polymer contains the constitutional unit derived from the (meth)acrylic acid ester (a-1) containing a hydrocarbon group having not less than 4 and not more than 8 carbon atoms, and the composition and contents of constitutional units derived from the respective monomers which are contained in the shell polymer are the same as those of the aforementioned shell portion resin.

In the process for producing the resin particle dispersion, more specifically, the step I is preferably conducted by the method in which the emulsion of the shell polymer forming the shell portion resin is mixed with an aqueous medium, and then the core portion resin monomer material for forming the core portion resin is added to the resulting mixture, and the thus obtained dispersion is heated while stirring, followed by further adding dropwise a water-soluble polymerization initiator thereto to react the respective components with each other, thereby forming the core/shell-type resin particles (A) and obtaining the resin particle dispersion.

After initiation of the reaction, the change in hue of the contents of a reaction vessel, etc., is observed to confirm formation of a core of respective particles, and then the reaction is continuously conducted while further adding dropwise the core portion resin monomer material to the reaction vessel, whereby it is possible to obtain the core/shell-type resin particles (A) as the aimed product.

The core portion resin monomer material may be added dropwise to the reaction vessel either directly or in the form of an emulsion previously prepared by dispersing the monomer material in an aqueous medium. The shell polymer acts as a protective colloid in the aqueous medium to stabilize the core (core portion) of the respective particles produced. The resin particle dispersion of the present invention obtained by this method is excellent in printability, since the resin particle dispersion has a viscosity close to that of a Newtonian fluid.

In addition, by appropriately changing the composition of the core portion resin monomer material in a stepwise manner, it is possible to produce a core portion constituted of a plurality of phases or a core portion whose composition is continuously changed from an innermost core outwardly.

The aqueous medium used upon production of the resin particle dispersion means such a medium in which water has a largest content among components of the medium.

As the water-soluble polymerization initiator, conventionally known polymerization initiators may be used. Specific examples of the water-soluble polymerization initiator include inorganic peroxides, such as potassium persulfate, sodium persulfate, ammonium persulfate, hydrogen peroxide, etc., azo-based polymerization initiators, such as 2,2′-azobis(2-amidinopropane)dihydrochloride, etc., redox polymerization initiators formed by using a peroxide compound in combination with a reducing agent, such as sodium sulfite, etc., and the like.

Upon conducting the polymerization reaction, a surfactant such as a nonionic surfactant, an anionic surfactant, a cationic surfactant, etc., may also be used therein. However, from the viewpoint of suppressing formation of particles formed of the core portion resin monomer material only and efficiently forming the core/shell-type resin particles, it is preferable to use no surfactant in the reaction.

The preferred polymerization conditions may vary depending upon the kind of polymerization initiator used, etc. The polymerization temperature is preferably not lower than 50° C. and not higher than 90° C., and the polymerization time is preferably not less than 1 hour and not more than 20 hours. In addition, the polymerization is preferably conducted in a nitrogen gas atmosphere or an atmosphere of an inert gas, such as argon, etc.

The resulting resin particle dispersion contains at least the core/shell-type resin particles (A) and water, and is therefore preferably used as such directly without removing the solvent used for production of the resin particle dispersion therefrom, from the viewpoint of well compounding the dispersion in an aqueous ink.

[Production of Emulsion of Shell Polymer]

The shell polymer forming the shell portion resin of the resin particles (A) may be either an appropriately synthesized product obtained by subjecting the shell portion resin monomer material to polymerization reaction by a conventionally known polymerization method, or a commercially available product.

As the method for producing the emulsion of the shell polymer, there may be mentioned a method of adding the shell polymer to an aqueous medium and subjecting the resulting mixture to dispersion treatment using a disperser, etc., a method of gradually adding an aqueous medium to an organic solvent solution containing the shell polymer to subject the solution to phase inversion emulsification, and the like. Of these methods, from the viewpoint of simplicity of the operation, preferred is the method using the phase inversion emulsification.

In the method using the phase inversion emulsification, as the polymerization method for production of the shell polymer, preferred is a solution polymerization method. In the solution polymerization method, the resulting shell polymer solution may be used in the phase inversion emulsification.

An organic solvent used in the solution polymerization method is not particularly limited, and is preferably an organic polar solvent, such as aliphatic alcohols having not less than 1 and not more than 3 carbon atoms, ketones having not less than 3 and not more than 8 carbon atoms, ethers, esters, and the like. Specific examples of the organic polar solvent include methanol, ethanol, acetone and methyl ethyl ketone. Of these solvents, preferred is methyl ethyl ketone.

The polymerization may be carried out in the presence of a polymerization initiator or a polymerization chain transfer agent. As the polymerization initiator, preferred are azo-based compounds, and more preferred are 4,4'-azobis(4-cyanovaleric acid), 2,2'-azobis(2,4-dimethylvaleronitrile), etc. As the polymerization chain transfer agent, preferred are mercaptans, and more preferred are 3-mercapto-propionic acid, 2-mercaptoethanol, etc.

The preferred polymerization conditions may vary depending upon the kind of polymerization initiator used, etc. The polymerization temperature is preferably not lower than 50° C. and not higher than 90° C., and the polymerization time is preferably not less than 1 hour and not more than 20 hours. In addition, the polymerization is preferably conducted in a nitrogen gas atmosphere or an atmosphere of an inert gas, such as argon, etc.

After completion of the polymerization reaction, the shell polymer thus produced may be isolated from the reaction solution by conventionally known methods, such as reprecipitation, removal of the solvent by distillation, etc. In addition, the thus obtained shell polymer may be subjected to reprecipitation, membrane separation, chromatography, extraction, etc., for removing unreacted monomers, etc., therefrom.

The shell portion resin is preferably directly used as such in the form of a shell polymer solution without removing the solvent used in the polymerization reaction therefrom, from the viewpoint of enhancing productivity of the resin particle dispersion.

The solid content of the shell polymer solution is preferably not less than 20% by mass, more preferably not less than 25% by mass and even more preferably not less than 30% by mass, and is also preferably not more than 70% by mass, more preferably not more than 65% by mass and even more preferably not more than 60% by mass, from the viewpoint of enhancing productivity of the resin particle dispersion. The solid content of the shell polymer solution may be measured by the method described in Examples below.

In the present invention, in the case where the shell polymer is an anionic polymer, the anionic groups contained in the shell polymer may be neutralized using a neutralizing agent. When using the neutralizing agent, the anionic groups contained in the shell polymer is preferably neutralized such that the pH value of the resulting shell polymer solution falls within the range of not less than 7 and not more than 11.

As the neutralizing agent, there may be mentioned hydroxides of alkali metals, ammonia, organic amines, etc. Examples of the hydroxides of alkali metals include lithium hydroxide, sodium hydroxide, potassium hydroxide, cesium hydroxide and the like. Examples of the organic amines include trimethylamine, ethylamine, diethylamine, triethylamine, triethanolamine, and the like.

Among these neutralizing agents, from the viewpoint of improving substrate-adhesion properties of the resulting ink, preferred are the hydroxides of alkali metals, such as sodium hydroxide, etc., and ammonia, and more preferred is sodium hydroxide.

The neutralizing agent is preferably used in the form of an aqueous neutralizing agent solution from the viewpoint of sufficiently and uniformly accelerating the neutralization of the anionic groups of the shell polymer. From the same viewpoint as described above, the concentration of the aqueous neutralizing agent solution is preferably not less than 3% by mass and not more than 30% by mass.

The neutralization degree of the anionic groups of the shell polymer is preferably not less than 30 mol %, more preferably not less than 40 mol % and even more preferably not less than 50 mol %, and is also preferably not more than 300 mol %, more preferably not more than 200 mol % and even more preferably not more than 150 mol %, from the viewpoint of improving substrate-adhesion properties of the resulting ink.

The neutralization degree as used herein means the value calculated by dividing a mole equivalent number of the neutralizing agent by a mole equivalent number of the anionic groups of the shell polymer.

The weight-average molecular weight of the shell polymer is preferably not less than 6,000, more preferably not less than 8,000 and even more preferably not less than 10,000, and is also preferably not more than 300,000, more preferably not more than 200,000, even more preferably not more than 100,000 and further even more preferably not more than 50,000, from the viewpoint of improving dispersion stability of the resin particles (A). The aforementioned weight-average molecular weight may be measured by the method described in Examples below.

The mass ratio of the content of the core portion resin to the content of the shell portion resin [core portion resin/shell portion resin] in the core/shell-type resin particles (A) is preferably not less than 0.6, more preferably not less than 0.8 and even more preferably not less than 1, and is also preferably not more than 3.0, more preferably not more than 2.7, even more preferably not more than 2.5 and further even more preferably not more than 2.3, from the viewpoint of improving substrate-adhesion properties of the resulting ink.

The acid value of the core/shell-type resin particles (A) means an acid value of the whole resins constituting the core portion and the shell portion, and is not less than 50 mgKOH/g, preferably not less than 55 mgKOH/g and more preferably not less than 60 mgKOH/g, and is also not more than 100 mgKOH/g, preferably not more than 95 mgKOH/g and more preferably not more than 90 mgKOH/g, from the viewpoint of improving substrate-adhesion properties of the resulting ink.

The acid value of the core/shell-type resin particles (A) may be calculated from a mass ratio between the respective monomers constituting the core/shell-type resin particles (A). In addition, the acid value of the core/shell-type resin particles (A) may also be measured by the method in which the core/shell-type resin particles (A) are dissolved in or swelled with an adequate organic solvent (e.g., methyl ethyl ketone), and then the resulting solution or swelled product is subjected to a neutralization titration method as prescribed in JIS K0070.

The average particle size of the core/shell-type resin particles (A) in the resin particle dispersion is preferably not less than 10 nm, more preferably not less than 20 nm and even more preferably not less than 40 nm, and is also preferably not more than 150 nm, more preferably not more than 120 nm and even more preferably not more than 100 nm, from the viewpoint of improving substrate-adhesion properties of the resulting ink.

The average particle size of the core/shell-type resin particles (A) in the resin particle dispersion may be measured by the method described in Examples below.

The solid content of the resin particle dispersion of the present invention is preferably not less than 15% by mass, more preferably not less than 20% by mass and even more preferably not less than 25% by mass, and is also preferably not more than 60% by mass, more preferably not more than 50% by mass and even more preferably not more than 40% by mass, from the viewpoint of well compounding the dispersion in the aqueous ink.

The solid content of the resin particle dispersion may be measured by the method described in Examples below.

<Pigment>

The resin particle dispersion of the present invention may also contain a pigment. Examples of the pigment include white pigments, such as titanium oxide, etc., as well as black pigments, such as carbon blacks, etc., chromatic color pigments, such as azo pigments, diazo pigments, phthalocyanine pigments, quinacridone pigments, isoindolinone pigments, dioxazine pigments, perylene pigments, perinone pigments, thioindigo pigments, anthraquinone pigments, quinophthalone pigments, etc., and the like.

The resin particle dispersion of the present invention preferably contains a white pigment that has been frequently used as a pigment for background color, from the viewpoint of improving substrate-adhesion properties of the resulting ink, and it is especially effective to use titanium oxide as the pigment.

(Titanium Oxide)

Examples of a crystal structure of the titanium oxide include a rutile type (tetragonal system) structure, an anatase type (tetragonal system) structure and a brookite type (orthorhombic system) structure. Among the titanium oxides having these crystal structures, from the viewpoint of stability of crystals, hiding power and availability of the titanium oxide, the rutile-type titanium oxide (hereinafter also referred to merely as "titanium oxide") is preferably used in the present invention.

The titanium oxide may be produced by either a gas phase method or a liquid phase method. From the viewpoint of facilitating production of the titanium oxide having high crystallinity, the titanium oxide produced by the gas phase method is more preferably used.

The titanium oxide used herein may also be in the from of an untreated titanium oxide. However, the titanium oxide is preferably in the from of a surface-treated titanium oxide from the viewpoint of confining photocatalytic activity of the titanium oxide and attaining good dispersibility of the titanium oxide. Examples of the surface treatment of the titanium oxide include a surface treatment with an inorganic material, a surface treatment with an organic material such as a titanium coupling agent, a silane coupling agent, etc., and the like. Among these surface treatments, the surface treatment with an inorganic material is preferably used.

As the method for surface-treating the titanium oxide with the inorganic material, there is more preferably used the method of surface-treating the titanium oxide with at least one inorganic material selected from the group consisting of alumina ($Al_2O_3$), silica ($SiO_2$), zinc oxide (ZnO), zirconia ($ZrO_2$) and the like.

The titanium oxide particles thus surface-treated are calcined at a temperature of from 800 to 1000° C., so that it is possible to suppress sintering between the titanium oxide particles and thereby improve flowability and dispersibility of the titanium oxide particles having a secondary particle size.

The particle shape of the titanium oxide is not particularly limited, and may be a granular shape, an acicular shape, etc. The average primary particle size of the titanium oxide as calculated in terms of an arithmetic mean of major axis diameters of primary particles of the titanium oxide is preferably not less than 40 nm, more preferably not less than 100 nm, even more preferably not less than 150 nm and further even more preferably not less than 200 nm from the viewpoint of whiteness of the titanium oxide, and is also preferably not more than 600 nm, more preferably not more than 500 nm and even more preferably not more than 400 nm from the viewpoint of hiding power of the titanium oxide.

Meanwhile, the average primary particle size of the titanium oxide may be expressed by an arithmetic mean of major axis diameters of primary particles of the titanium oxide, and more specifically may be measured by the method described in Examples below.

Examples of commercially available products of the rutile-type titanium dioxide include "TIPAQUE R" (tradename) series products, "TIPAQUE CR" (tradename) series products and "TIPAQUE PF" (tradename) series products all available from Ishihara Sangyo Kaisha, Ltd.; "R" (tradename) series products available from Sakai Chemical Industry Co., Ltd.; "JR" (tradename) series products and "MT" (tradename) series products both available from TAYCA Corporation; "KURONOS KR" (tradename) series products available from Titan Kogyo Co., Ltd.; "TR" (tradename) series products available from Huntsmann Corporation; and the like.

[Titanium Oxide Dispersion]

The titanium oxide is preferably compounded in the form of a titanium oxide dispersion into the resin particle dispersion of the present invention. More specifically, in the case where the resin particle dispersion of the present invention further contains the titanium oxide as a pigment, it is preferred that the titanium oxide dispersion is further added and mixed into the resin particle dispersion obtained in the aforementioned step I to obtain a titanium oxide-containing resin particle dispersion.

The titanium oxide is preferably dispersed with a polymer dispersant. The polymer dispersant used for dispersing the titanium oxide is not particularly limited, and is preferably a polymer containing a constitutional unit derived from the ionic monomer (a-2) which is used as a monomer component of the shell portion resin of the core/shell-type resin particles (A), more preferably a polymer further containing at least one constitutional unit selected from the group consisting of a constitutional unit derived from the (meth) acrylic acid ester (a-1) or the hydrophobic monomer (a-3), and a constitutional unit derived from the hydrophilic nonionic monomer (a-4) in addition to the constitutional unit derived from the ionic monomer (a-2), and even more preferably a polymer containing the constitutional unit derived from the ionic monomer (a-2) and the constitutional unit derived from the hydrophilic nonionic monomer (a-4).

As suitable examples of the polymer dispersant used for dispersing the titanium oxide, from the viewpoint of improving dispersion stability of the resulting titanium oxide dispersion, more preferred are those polymers containing, as the ionic monomer (a-2), preferably an anionic monomer, more preferably a carboxylic acid monomer and even more preferably at least one monomer selected from the group consisting of acrylic acid and methacrylic acid, and also containing, as the hydrophilic nonionic monomer (a-4), preferably at least one monomer selected from the group consisting of a polyalkylene glycol (meth)acrylate and an alkoxy polyalkylene glycol (meth)acrylate and more preferably methoxy polyethylene glycol (n=1 to 30) (meth) acrylate.

In this case, from the viewpoint of improving dispersion stability of the resulting titanium oxide dispersion, the content of the constitutional unit derived from the ionic monomer (a-2) in the polymer dispersant is preferably not less than 5% by mass, more preferably not less than 10% by mass and even more preferably not less than 15% by mass, and is also preferably not more than 35% by mass, more preferably not more than 30% by mass and even more preferably not more than 25% by mass.

From the same viewpoint as described above, the content of the constitutional unit derived from the hydrophilic nonionic monomer (a-4) in the polymer dispersant is preferably not less than 65% by mass, more preferably not less than 70% by mass and even more preferably not less than 75% by mass, and is also preferably not more than 95% by mass, more preferably not more than 90% by mass and even more preferably not more than 85% by mass.

The method for producing the aforementioned polymer dispersant is preferably the same as the aforementioned method for producing the shell polymer.

The titanium oxide dispersion may be produced by subjecting a mixture containing the titanium oxide, the polymer dispersant and a water-based medium containing water as a main component to dispersion treatment.

The dispersion treatment may be conducted using kneading machines, such as roll mills, kneaders, etc., high-pressure homogenizers, such as "MICROFLUIDIZER" available from Microfluidics Corporation, etc., media-type dispersers, such as paint shakers, beads mills, etc., and the like, by conventionally known methods.

In addition, in the case where the polymer dispersant contains carboxy groups as a salt-forming group thereof, at least a part of the carboxy groups is preferably neutralized using a neutralizing agent, such as an alkali metal hydroxide, etc.

The content of the polymer dispersant in the titanium oxide dispersion is preferably not less than 0.5 part by mass, more preferably not less than 1.0 part by mass, even more preferably not less than 1.3 parts by mass and further even more preferably not less than 1.8 parts by mass, and is also preferably not more than 7 parts by mass, more preferably not more than 6.5 parts by mass, even more preferably not more than 6.0 parts by mass, further even more preferably not more than 5.5 parts by mass, still further even more preferably not more than 4.0 parts by mass and furthermore preferably 3.0 parts by mass, on the basis of 100 parts by mass of the titanium oxide, from the viewpoint of improving dispersion stability of the resulting titanium oxide dispersion and improving optical density of the resulting ink upon printing.

The content of water in the titanium oxide dispersion is preferably not less than 30% by mass and more preferably not less than 40% by mass, and is also preferably not more than 70% by mass and more preferably not more than 60% by mass, from the viewpoint of reducing burden on the environments.

The average particle size of the titanium oxide particles in the titanium oxide dispersion is preferably not less than 150 nm, more preferably not less than 180 nm and even more preferably not less than 200 nm, and is also preferably not more than 700 nm, more preferably not more than 600 nm and even more preferably not more than 500 nm, from the viewpoint of improving optical density of the resulting ink upon printing. The average particle size of the titanium oxide particles in the titanium oxide dispersion may be measured by the method described in Examples below.

The solid content of the titanium oxide dispersion (concentration of non-volatile components in the titanium oxide dispersion) is preferably not less than 30% by mass and more preferably not less than 40% by mass, and is also preferably not more than 70% by mass and more preferably not more than 60% by mass, from the viewpoint of improving dispersion stability of the resulting titanium oxide dispersion.

The solid content of the dispersion of the pigment such as titanium oxide, etc., may be measured by the method described in Examples below.

<Water-Soluble Organic Solvent>

The resin particle dispersion of the present invention may also contain a water-soluble organic solvent. Examples of the water-soluble organic solvent include glycol ethers, alcohols, divalent or higher-valent polyhydric alcohols, such as glycols, etc., pyrrolidones, alkanol amines, and the like. Of these water-soluble organic solvents, preferred are glycol ethers and glycols from the viewpoint of improving substrate-adhesion properties of the resulting ink. These water-soluble organic solvents may be used alone or in combination of any two or more thereof.

The resin particle dispersion of the present invention preferably contains a glycol ether from the viewpoint of plasticizing the core/shell-type resin particles (A) and thereby improving substrate-adhesion properties of the resulting ink.

The glycol ether preferably contains at least one hydrocarbon group having not less than 2 and not more than 8 carbon atoms.

Examples of the glycol ether include those glycol ethers whose ether moiety contains a hydrocarbon group having not less than 2 and not more than 8 carbon atoms, e.g., alkylene glycol monoalkyl ethers, such as monoalkylene glycol monoalkyl ethers, dialkylene glycol monoalkyl ethers, trialkylene glycol monoalkyl ethers, etc.; and alkylene glycol dialkyl ethers, such as monoalkylene glycol dialkyl ethers, dialkylene glycol dialkyl ethers, etc.

The polyalkylene glycol moiety of the respective glycol ethers may be in the form of an ethyleneoxide adduct, a propyleneoxide adduct or an ethyleneoxide/propyleneoxide mixed adduct. Of these adducts, preferred is the ethyleneoxide adduct.

Of these glycol ethers, from the viewpoint of improving drying properties and leveling properties of the resulting ink, preferred are alkylene glycol monoalkyl ethers; and more preferred is at least one compound selected from the group consisting of ethylene glycol monoisopropyl ether, ethylene glycol monobutyl ether, ethylene glycol monoisobutyl ether, ethylene glycol hexyl ether, diethylene glycol monoethyl ether, diethylene glycol monoisopropyl ether, diethylene glycol monobutyl ether, diethylene glycol monoisobutyl ether, dipropylene glycol monohexyl ether, triethylene glycol monobutyl ether and ethylene glycol monobenzyl ether.

Examples of the glycols include ethylene glycol, 1,2-propanediol, 1,2-butanediol, 1,2-hexanediol, 1,3-propanediol, 1,3-butanediol, diethylene glycol, and the like. Of these glycols, preferred are alkanediols having not less than 3 and not more than 4 carbon atoms, such as 1,2-propanediol, diethylene glycol, etc.

<Contents of Respective Components in Resin Particle Dispersion>

The contents of the respective components in the resin particle dispersion of the present invention are as follows from the viewpoint of improving substrate-adhesion properties of the resulting ink.

The content of the core/shell-type resin particles (A) in the resin particle dispersion is preferably not less than 5% by mass, more preferably not less than 10% by mass and even more preferably not less than 15% by mass, and is also preferably not more than 50% by mass, more preferably not more than 40% by mass and even more preferably not more than 35% by mass.

The content of water in the resin particle dispersion is preferably not less than 30% by mass, more preferably not less than 40% by mass, even more preferably not less than 45% by mass, further even more preferably not less than 50% by mass and still further even more preferably not less than 53% by mass, and is also preferably not more than 80% by mass, more preferably not more than 75% by mass, even more preferably not more than 70% by mass and further even more preferably not more than 65% by mass, from the viewpoint of reducing burden on the environments.

In the case where the resin particle dispersion further contains the pigment, the content of the pigment in the resin particle dispersion is preferably not less than 3% by mass, more preferably not less than 5% by mass and even more preferably not less than 10% by mass, and is also preferably not more than 50% by mass, more preferably not more than 40% by mass, even more preferably not more than 30% by mass and further even more preferably not more than 20% by mass, from the viewpoint of improving optical density of the resulting ink upon printing.

In the case where the resin particle dispersion further contains the water-soluble organic solvent, the content of the water-soluble organic solvent in the resin particle dispersion is preferably not less than 0.2% by mass, more preferably not less than 0.5% by mass and even more preferably not less than 0.8% by mass, and is also preferably not more than 30% by mass, more preferably not more than 25% by mass and even more preferably not more than 20% by mass.

In the case where the resin particle dispersion further contains the pigment, the mass ratio of the content of the pigment to the content of the core/shell-type resin particles (A) [pigment/core/shell-type resin particles (A)] in the resin particle dispersion is preferably not less than 0.3, more preferably not less than 0.5, even more preferably not less than 0.8, further even more preferably not less than 1.0, still further even more preferably not less than 1.3, furthermore preferably not less than 1.5 and even furthermore preferably not less than 1.8 from the viewpoint of improving optical density of the resulting ink upon printing, and is also preferably not more than 4, more preferably not more than 3 and even more preferably not more than 2.5 from the viewpoint of improving substrate-adhesion properties of the resulting ink.

In the case where the resin particle dispersion further contains the water-soluble organic solvent, the mass ratio of the content of water to the content of the water-soluble organic solvent [water/water-soluble organic solvent] in the resin particle dispersion is preferably not less than 0.5, more preferably not less than 1, even more preferably not less than 2 and further even more preferably not less than 2.5, and is also preferably not more than 100, more preferably not more than 50, even more preferably not more than 30, further even more preferably not more than 10, still further even more preferably not more than 5 and furthermore preferably not more than 3.5.

In the present invention, the pigment-containing resin particle dispersion may be directly used as an ink.

[Aqueous Ink]

The resin particle dispersion of the present invention may be used as an aqueous ink, such as an ink for ink-jet printing, an ink for gravure printing, an ink for flexo printing, etc., and is preferably used as an aqueous ink for gravure printing from the viewpoint of improving substrate-adhesion properties of the resulting ink.

The aforementioned aqueous ink may be prepared by further mixing the resin particle dispersion with various additives, such as a surfactant, a humectant, a wetting agent, a wetting penetrant, a dispersant, a viscosity controller, a defoaming agent, an antiseptic agent, a mildew-proof agent, a rust preventive, etc., if required.

The contents of the core/shell-type resin particles (A), water, the pigment and the water-soluble organic solvent in the aqueous ink are basically identical to the contents of these components in the aforementioned resin particle dispersion.

Examples of the surfactant used in the aforementioned aqueous ink include an anionic surfactant, a nonionic surfactant, an amphoteric surfactant, and the like. Among these surfactants, preferred is a nonionic surfactant, more preferred is at least one surfactant selected from the group consisting of an acetylene glycol-based surfactant and a polyether-modified silicone-based surfactant, and even more preferred is an acetylene glycol-based surfactant.

As the acetylene glycol-based surfactant, there may be mentioned at least one acetylene glycol selected from the group consisting of 2,4,7,9-tetramethyl-5-decyne-4,7-diol, 3,6-dimethyl-4-octyne-3,6-diol and 2,5-dimethyl-3-hexyne-2,5-diol, and ethyleneoxide adducts of these acetylene glycols. Of these acetylene glycol-based surfactants, preferred is 2,4,7,9-tetramethyl-5-decyne-4,7-diol.

Specific examples of commercially available products of the acetylene glycol-based surfactant include "SURFYNOL" series products (2,4,7,9-tetramethyl-5-decyne-4,7-diol or an ethyleneoxide adduct of 2,4,7,9-tetramethyl-5-decyne-4,7-diol) available from Nissin Chemical Industry Co., Ltd., "ACETYLENOL" series products available from Kawaken Fine Chemicals Co., Ltd., and the like.

The polyether-modified silicone-based surfactant has such a structure that a hydrocarbon group bonded to a side chain and/or a terminal end of a silicone oil is substituted with a polyether group. Examples of the suitable polyether group of the polyether-modified silicone-based surfactant include a polyethyleneoxy group, a polypropyleneoxy group and a polyalkyleneoxy group formed by addition-bonding an ethyleneoxy group (EO) and a propyleneoxy group (a trimethyleneoxy group or a propane-1,2-diyloxy group; PO) to each other in a block form or a random form. More specifically, as the polyether-modified silicone-based surfactant, there may be used a compound formed by grafting a polyether group to a main chain of a silicone, a compound formed by bonding a silicone and a polyether group to each other in a block form, and the like.

Specific examples of the polyether-modified silicone-based surfactant include "KF" series products available from Shin-Etsu Chemical Co., Ltd., "SILFACE SAG" available from Nissin Chemical Industry Co., Ltd., "BYK" series products available from BYK Chemie Japan K.K., and the like.

The pH value of the aqueous ink is preferably not less than 5.5, more preferably not less than 6.0 and even more preferably not less than 6.5 from the viewpoint of improving storage stability of the resulting ink, and is also preferably not more than 11.0, more preferably not more than 10.0 and even more preferably not more than 9.5 from the viewpoint of suppressing skin irritation.

[Printing Method]

Examples of a printing substrate to which the aforementioned aqueous ink can be applied include a high-water absorbing plain paper, a low-water absorbing coated paper and a resin film. Specific examples of the coated paper include a versatile glossy coated paper, a multi-color foam glossy coated paper, and the like. Specific examples of the resin film include a polyester film, a polyvinyl chloride film, a polypropylene film, a polyethylene film, and the like.

The aqueous ink is preferably used in such a printing method in which the printing is conducted on the resin film as the printing substrate in view of excellent substrate-adhesion properties of the ink.

The resin film as the printing substrate may be in the form of any of a biaxially oriented film, a monoaxially oriented film and a non-oriented film. Of these resin films, more preferred are a polyester film and an oriented polypropylene film, and even more preferred are a polyethylene terephthalate (PET) film subjected to corona discharge treatment and a biaxially oriented polypropylene (OPP) film subjected to corona discharge treatment.

In particular, in the case where the shell portion resin contains the constitutional unit derived from the ionic monomer (a-2), and the resin film subjected to corona discharge treatment is used as the printing substrate, the resulting ink is further improved in substrate-adhesion properties by the interaction between the polar group on a surface of the substrate which is imparted by the corona discharge treatment and the ionic group that is introduced into the shell portion resin of the respective core/shell-type resin particles. From this viewpoint, the printing substrate is preferably the resin film subjected to corona discharge treatment, and more preferably at least one resin film selected from the group consisting of a polyethylene terephthalate (PET) film subjected to corona discharge treatment and a biaxially oriented polypropylene (OPP) film subjected to corona discharge treatment.

The thickness of the printing substrate is preferably not less than 5 μm, more preferably not less than 10 μm and even more preferably not less than 15 μm, and is also preferably not more than 100 μm, more preferably not more than 80 μm, even more preferably not more than 60 μm and further even more preferably not more than 40 μm, from the viewpoint of improving substrate-adhesion properties of the resulting ink and availability of the printing substrate.

With respect to the aforementioned embodiments, the present invention further provides the following inventive aspects.

<1> A resin particle dispersion containing core/shell-type resin particles (A) and water, in which:
- a shell portion resin of the core/shell-type resin particles (A) contains a constitutional unit derived from a (meth) acrylic acid ester (a-1) containing a hydrocarbon group having not less than 4 and not more than 8 carbon atoms;
- a core portion resin of the core/shell-type resin particles (A) contains a constitutional unit derived from a (meth) acrylamide-based monomer (b-1) whose solubility parameter lies within the range of not less than 17.0 $(J/cm^3)^{0.5}$ and not more than 21.0 $(J/cm^3)^{0.5}$ in an amount of not less than 5% by mass;
- a glass transition temperature of the core portion resin is not higher than 50° C.; and
- an acid value of the core/shell-type resin particles (A) is not less than 50 mgKOH/g and not more than 100 mgKOH/g.

<2> The resin particle dispersion according to the above aspect <1>, wherein the (meth)acrylic acid ester (a-1) is preferably at least one compound selected from the group consisting of an alkyl (meth)acrylate and an aromatic group-containing (meth)acrylate, and more preferably an alkyl (meth)acrylate.

<3> The resin particle dispersion according to the above aspect <2>, wherein the alkyl (meth)acrylate contains an alkyl group preferably having not less than 4 and not more than 8 carbon atoms and more preferably not less than 4 and not more than 6 carbon atoms.

<4> The resin particle dispersion according to any one of the above aspects <1> to <3>, wherein the shell portion resin further contains a constitutional unit derived from an ionic monomer (a-2).

<5> The resin particle dispersion according to the above aspect <4>, wherein the ionic monomer (a-2) is preferably a carboxy group-containing carboxylic acid monomer, more preferably at least one monomer selected from the group consisting of acrylic acid, methacrylic acid, crotonic acid, itaconic acid, maleic acid, fumaric acid, citraconic acid and 2-methacryloyloxymethylsuccinic acid, and even more preferably at least one monomer selected from the group consisting of acrylic acid and methacrylic acid.

<6> The resin particle dispersion according to any one of the above aspects <1> to <5>, wherein a content of the (meth) acrylic acid ester (a-1) in the shell portion resin monomer material or a content of the constitutional unit derived from the (meth)acrylic acid ester (a-1) in the shell portion resin is preferably not less than 40% by mass, more preferably not less than 50% by mass and even more preferably not less than 60% by mass, and is also preferably not more than 95% by mass, more preferably not more than 90% by mass and even more preferably not more than 85% by mass.

<7> The resin particle dispersion according to any one of the above aspects <4> to <6>, wherein a content of the ionic monomer (a-2) in the shell portion resin monomer material or a content of the constitutional unit derived from the ionic monomer (a-2) in the shell portion resin is preferably not less than 5% by mass, more preferably not less than 10% by mass and even more preferably not less than 15% by mass, and is also preferably not more than 60% by mass, more preferably not more than 50% by mass and even more preferably not more than 40% by mass.

<8> The resin particle dispersion according to any one of the above aspects <1> to <7>, wherein an acid value of the shell portion resin is preferably not less than 100 mgKOH/g, more preferably not less than 120 mgKOH/g, even more preferably not less than 150 mgKOH/g and further even more preferably not less than 170 mgKOH/g, and is also preferably not more than 280 mgKOH/g, more preferably not more than 260 mgKOH/g, even more preferably not more than 250 mgKOH/g and further even more preferably not more than 200 mgKOH/g.

<9> The resin particle dispersion according to any one of the above aspects <1> to <8>, wherein the SP value of the (meth)acrylamide-based monomer (b-1) is preferably not less than 17.3 $(J/cm^3)^{0.5}$ and more preferably not less than 17.5 $(J/cm^3)^{0.5}$, and is also preferably not more than 20.7 $(J/cm^3)^{0.5}$ and more preferably not more than 20.5 $(J/cm^3)^{0.5}$.

<10> The resin particle dispersion according to any one of the above aspects <1> to <9>, wherein the (meth)acrylamide-based monomer (b-1) is preferably at least one monomer selected from the group consisting of an N-alkyl (meth)acrylamide containing a linear, branched or cyclic alkyl group, an aromatic group-containing (meth)acrylamide and an N-alkoxy methyl (meth)acrylamide, and more preferably at least one monomer selected from the group consisting of N-tert-butyl acrylamide, N-tert-octyl acrylamide, N-(2-ethylhexyl)acrylamide, N-n-octyl acrylamide, N-dodecyl acrylamide, N-n-heptyl acrylamide, N-hexyl acrylamide, N-cyclohexyl methacrylamide, N,N-dibenzyl acrylamide and N-isobutoxymethyl acrylamide.

<11> The resin particle dispersion according to any one of the above aspects <1> to <10>, wherein the (meth)acrylamide-based monomer (b-1) is preferably an N-alkyl (meth)acrylamide containing a linear, branched or cyclic alkyl group, more preferably an N-alkyl acrylamide containing a branched alkyl group, even more preferably an N-alkyl acrylamide containing a branched alkyl group having not less than 4 and not more than 8 carbon atoms, and further even more preferably at least one compound selected from the group consisting of N-tert-butyl acrylamide and N-tert-octyl acrylamide.

<12> The resin particle dispersion according to any one of the above aspects <1> to <11>, wherein the core portion resin further contains a (meth)acrylic acid ester (b-2) containing a hydrocarbon group having not less than 2 and not more than 18 carbon atoms.

<13> The resin particle dispersion according to the above aspect <12>, wherein the number of carbon atoms in the hydrocarbon group in the (meth)acrylic acid ester (b-2) is preferably not less than 3 and more preferably not less than 4, and is also preferably not more than 12 and more preferably not more than 8.

<14> The resin particle dispersion according to the above aspect <12> or <13>, wherein the hydrocarbon group having not less than 2 and not more than 18 carbon atoms in the (meth)acrylic acid ester (b-2) is preferably at least one group selected from the group consisting of an alkyl group having not less than 3 and not more than 12 carbon atoms and a benzyl group, more preferably at least one group selected from the group consisting of a butyl group, an isobutyl group, a sec-butyl group, a tert-butyl group, a hexyl group, an octyl group, a 2-ethylhexyl group, an octadecyl group, a cyclohexyl group and a benzyl group, more preferably at least one group selected from the group consisting of a butyl group, an isobutyl group, a sec-butyl group, a tert-butyl group, a hexyl group, an octyl group, a 2-ethylhexyl group and a benzyl group, and even more preferably an isobutyl group.

<15> The resin particle dispersion according to any one of the above aspects <12> to <14>, wherein the (meth)acrylic acid ester (b-2) containing the hydrocarbon group having not less than 2 and not more than 18 carbon atoms is preferably at least one compound selected from the group consisting of butyl (meth)acrylate, isobutyl (meth)acrylate, sec-butyl (meth)acrylate, tert-butyl (meth)acrylate, hexyl (meth)acrylate, octyl (meth)acrylate, 2-ethylhexyl (meth)acrylate and benzyl (meth)acrylate, more preferably at least one compound selected from the group consisting of isobutyl (meth)acrylate, sec-butyl (meth)acrylate, tert-butyl (meth)acrylate, 2-ethylhexyl (meth)acrylate and benzyl (meth)acrylate, and even more preferably isobutyl (meth)acrylate.

<16> The resin particle dispersion according to any one of the above aspects <1> to <15>, wherein a content of the (meth)acrylamide-based monomer (b-1) in the core portion resin monomer material or a content of the constitutional unit derived from the (meth)acrylamide-based monomer (b-1) in the core portion resin is preferably not less than 7% by mass and more preferably not less than 10% by mass, and is also preferably not more than 60% by mass, more preferably not more than 50% by mass, even more preferably not more than 40% by mass, further even more preferably not more than 30% by mass and still further even more preferably not more than 20% by mass.

<17> The resin particle dispersion according to any one of the above aspects <12> to <16>, wherein a content of the (meth)acrylic acid ester (b-2) containing the hydrocarbon group having not less than 2 and not more than 18 carbon atoms in the core portion resin monomer material or a content of a constitutional unit derived from the (meth)acrylic acid ester (b-2) containing the hydrocarbon group having not less than 2 and not more than 18 carbon atoms in the core portion resin is preferably not less than 30% by mass, more preferably not less than 40% by mass, even more preferably not less than 50% by mass and further even more preferably not less than 70% by mass, and is also preferably not more than 95% by mass, more preferably not more than 93% by mass and even more preferably not more than 90% by mass.

<18> The resin particle dispersion according to any one of the above aspects <1> to <17>, wherein a glass transition temperature of the core portion resin is preferably not higher than 40° C., more preferably not higher than 35° C., even more preferably not higher than 30° C., further even more preferably not higher than 25° C. and still further even more preferably not higher than 10° C., and is also preferably not lower than −13° C., more preferably not lower than −10° C. and even more preferably not lower than −7° C.

<19> The resin particle dispersion according to any one of the above aspects <1> to <18>, wherein an acid value of the core portion resin is preferably not more than 50 mgKOH/g, more preferably not more than 30 mgKOH/g, even more preferably not more than 10 mgKOH/g and further even more preferably 0 mgKOH/g.

<20> The resin particle dispersion according to any one of the above aspects <1> to <19>, wherein a mass ratio of the content of the core portion resin to the content of the shell portion resin [core portion resin/shell portion resin] in the core/shell-type resin particles (A) is preferably not less than 0.6, more preferably not less than 0.8 and even more preferably not less than 1, and is also preferably not more than 3.0, more preferably not more than 2.7, even more preferably not more than 2.5 and further even more preferably not more than 2.3.

<21> The resin particle dispersion according to any one of the above aspects <1> to <20>, wherein the acid value of the core/shell-type resin particles (A) is preferably not less than 55 mgKOH/g and more preferably not less than 60 mgKOH/g, and is also not more than 100 mgKOH/g, preferably not more than 95 mgKOH/g and more preferably not more than 90 mgKOH/g.

<22> The resin particle dispersion according to any one of the above aspects <1> to <21>, wherein an average particle size of the core/shell-type resin particles (A) in the resin particle dispersion is preferably not less than 10 nm, more preferably not less than 20 nm and even more preferably not less than 40 nm, and is also preferably not more than 150 nm, more preferably not more than 120 nm and even more preferably not more than 100 nm.

<23> The resin particle dispersion according to any one of the above aspects <1> to <22>, further containing a pigment.

<24> The resin particle dispersion according to the above aspect <23>, wherein the pigment is a white pigment.

<25> The resin particle dispersion according to the above aspect <23> or <24>, wherein titanium oxide is used as the pigment.

<26> The resin particle dispersion according to any one of the above aspects <23> to <25>, wherein the titanium oxide is dispersed therein with a polymer dispersant.

<27> The resin particle dispersion according to any one of the above aspects <1> to <26>, wherein a content of the core/shell-type resin particles (A) in the resin particle dispersion is preferably not less than 5% by mass, more preferably not less than 10% by mass and even more preferably not less than 15% by mass, and is also preferably not more than 50% by mass, more preferably not more than 40% by mass and even more preferably not more than 35% by mass.

<28> The resin particle dispersion according to any one of the above aspects <1> to <27>, wherein a content of water in the resin particle dispersion is preferably not less than 30% by mass, more preferably not less than 40% by mass, even more preferably not less than 45% by mass, further even more preferably not less than 50% by mass and still further even more preferably not less than 53% by mass, and is also preferably not more than 80% by mass, more preferably not more than 75% by mass, even more preferably not more than 70% by mass and further even more preferably not more than 65% by mass.

<29> The resin particle dispersion according to any one of the above aspects <1> to <28>, wherein in the case where the resin particle dispersion further contains the pigment, a content of the pigment in the resin particle dispersion is preferably not less than 3% by mass, more preferably not less than 5% by mass and even more preferably not less than 10% by mass, and is also preferably not more than 50% by mass, more preferably not more than 40% by mass, even more preferably not more than 30% by mass and further even more preferably not more than 20% by mass.

<30> The resin particle dispersion according to any one of the above aspects <1> to <29>, wherein in the case where the resin particle dispersion further contains the pigment, a mass ratio of the content of the pigment to the content of the core/shell-type resin particles (A) [pigment/core/shell-type resin particles (A)] in the resin particle dispersion is preferably not less than 0.3, more preferably not less than 0.5, even more preferably not less than 0.8, further even more preferably not less than 1.0, still further even more preferably not less than 1.3, furthermore preferably not less than 1.5 and even furthermore preferably not less than 1.8, and is also preferably not more than 4, more preferably not more than 3 and even more preferably not more than 2.5.

<31> The resin particle dispersion according to any one of the above aspects <1> to <30>, wherein in the case where the resin particle dispersion further contains a water-soluble organic solvent, a content of the water-soluble organic solvent in the resin particle dispersion is preferably not less than 0.2% by mass, more preferably not less than 0.5% by mass and even more preferably not less than 0.8% by mass, and is also preferably not more than 30% by mass, more preferably not more than 25% by mass and even more preferably not more than 20% by mass.

<32> The resin particle dispersion according to any one of the above aspects <1> to <31>, wherein in the case where the resin particle dispersion further contains the water-soluble organic solvent, a mass ratio of the content of water to the content of the water-soluble organic solvent [water/water-soluble organic solvent] in the resin particle dispersion is preferably not less than 0.5, more preferably not less than 1, even more preferably not less than 2 and further even more preferably not less than 2.5, and is also preferably not more than 100, more preferably not more than 50, even more preferably not more than 30, further even more preferably not more than 10, still further even more preferably not more than 5 and furthermore preferably not more than 3.5.

<33> The resin particle dispersion according to any one of the above aspects <1> to <32>, wherein the resin particle dispersion is used as an aqueous ink for gravure printing.

<34> A use of the resin particle dispersion according to any one of the above aspects <1> to <32> as an aqueous ink for gravure printing which is used for printing characters or images on a printing substrate having a thickness of not less than 5 μm and not more than 100 μm.

<35> A process for producing the resin particle dispersion according to any one of the above aspects <1> to <33>, including: Step I of subjecting the core portion resin monomer material for forming the core portion resin to polymerization reaction in the presence of an emulsion of a shell polymer forming the shell portion resin to form the core/shell-type resin particles (A) and thereby obtain the resin particle dispersion.

<36> The process for producing the resin particle dispersion, according to the above aspect <35>, wherein a titanium oxide dispersion is further added and mixed into the resin particle dispersion obtained in the step I to obtain a titanium oxide-containing resin particle dispersion.

<37> The process for producing the resin particle dispersion, according to the above aspect <36>, wherein the titanium oxide is dispersed in the titanium oxide dispersion with a polymer dispersant.

<38> The process for producing the resin particle dispersion, according to any one of the above aspects <35> to <37>, wherein a weight-average molecular weight of the shell polymer is preferably not less than 6,000, more preferably not less than 8,000 and even more preferably not less than 10,000, and is also preferably not more than 300,000, more preferably not more than 200,000, even more preferably not more than 100,000 and further even more preferably not more than 50,000.

<39> A printing method including the step of printing characters or images on a resin film as a printing substrate by using the resin particle dispersion according to any one of the above aspects <1> to <33> as an aqueous ink.

<40> The printing method according to the above aspect <39>, wherein the printing substrate is preferably a resin film subjected to corona discharge treatment, and more preferably at least one film selected from the group consisting of a polyethylene terephthalate film subjected to corona discharge treatment and a biaxially oriented polypropylene film subjected to corona discharge treatment.

<41> The printing method according to the above aspect <39> or <40>, wherein the thickness of the printing substrate is preferably not less than 5 μm, more preferably not less than 10 μm and even more preferably not less than 15 μm, and is also preferably not more than 100 μm, more preferably not more than 80 μm, even more preferably not more than 60 μm and further even more preferably not more than 40 μm.

EXAMPLES

In the following Production Examples, Examples and Comparative Examples, the "part(s)" and "%" indicate "part(s) by mass" and "% by mass", respectively, unless otherwise specified. Meanwhile, various properties were measured by the following methods.

(1) Measurement of Weight-Average Molecular Weight of Polymer

The weight-average molecular weight of the polymer was measured by gel chromatography [GPC apparatus: "Model: HLC-8320GPC" available from Tosoh Corporation; columns: "TSKgel Super AWM-H", "TSKgel Super AW3000" and "TSKgel guardcolumn Super AW-H" (tradenames) all available from Tosoh Corporation; flow rate: 0.5 mL/min] using a solution prepared by dissolving phosphoric acid and lithium bromide in N,N-dimethylformamide such that concentrations of phosphoric acid and lithium bromide in the resulting solution were 60 mmol/L and 50 mmol/L, respectively, as an eluent, and using kits of monodisperse polystyrenes having previously known molecular weights [PStQuick B (F-550, F-80, F-10, F-1, A-1000), PStQuick C (F-288, F-40, F-4, A-5000, A-500] (tradenames) all available from Tosoh Corporation as a reference standard substance.

As a sample to be measured, there was used a dispersion prepared by mixing 0.1 g of the polymer with 10 mL of the aforementioned eluent in a glass vial, stirring the resulting mixture with a magnetic stirrer at 25° C. for 10 hours, and then subjecting the mixture to filtration treatment through a syringe filter "DISMIC-13HP" (tradename; material of membrane filter: hydrophilic PTFE; pore size: 0.2 µm) available from Advantec Co., Ltd.

(2-1) Measurement of Average Primary Particle Size of Titanium Oxide

The average primary particle size of the titanium oxide was determined by the following method. That is, using a transmission electron microscope "JEM-2100" available form JEOL Ltd., 500 primary particles of the titanium oxide were extracted by image analysis to measure their particle sizes and calculate an average value of the thus measured particles sizes as a number-average particle size thereof. Meanwhile, in the case where the respective titanium oxide particles had a major axis diameter and a minor axis diameter, the average primary particle size of the titanium oxide was calculated by using the major axis diameters thereof.

(2-2) Measurement of Average Particle Size of Particles in Titanium Oxide Dispersion Using a laser diffraction/scattering particle size distribution measuring apparatus "LA950" available from HORIBA Ltd., under such a measuring condition that a refractive index of the titanium oxide was regarded as being 2.75, water having a refractive index of 1.333 was used as a dispersing medium thereof, and further a scale of a circulating rate and a scale of intensity of an ultrasonic wave of the apparatus were set to "5" and "3", respectively, the titanium oxide dispersion was irradiated with laser light for 1 minute, followed by measuring particle sizes of the particles in the titanium oxide dispersion. At this time, the value of the volume median particle size ($D_{50}$) of the particles thus measured was determined as an average particle size of the particles dispersed in the titanium oxide dispersion.

(3) Measurement of Average Particle Sizes of Particles in Resin Particle Dispersion and Emulsion of Shell Polymer The resin particle dispersion and the emulsion of the shell polymer were subjected to cumulant analysis using a laser particle analyzing system "ELSZ-1000" available from Otsuka Electrics Co., Ltd., and the cumulant average particle size obtained by the measurement was defined as an average particle size of particles in each of the resin particle dispersion and the emulsion of the shell polymer. The measurement was conducted under the conditions including a temperature of 25° C., an angle between incident light and detector of 165° and a cumulative number of 100 times, and a refractive index of water (1.333) was input to the analyzing system as a refractive index of the dispersing medium. The concentration of each sample to be measured was adjusted to $5 \times 10^{-3}$% (in terms of a solid content thereof).

(4-1) Measurement of Solid Contents of Resin Particle Dispersion and Emulsion of Shell Polymer Using an infrared moisture meter "FD-230" (tradename) available from Kett Electric Laboratory, 5 g of an aqueous dispersion liquid to be measured was dried at a drying temperature of 150° C. under a measuring mode 96 (monitoring time: 2.5 minutes/variation range: 0.05%) to measure a water content on a wet base (% by mass) of the aqueous dispersion liquid (the resin particle dispersion or the emulsion of the shell polymer). The solid content of the aqueous dispersion liquid was calculated according to the following formula:

Solid Content (% by mass)=100−Water Content on Wet Base (% by mass) of Aqueous Dispersion Liquid (4-2) Measurement of Solid Contents of Polymer Solution and Pigment Dispersion Sodium sulfate dried to a constant weight in a desiccator was weighed in an amount of 10.0 g and charged into a 30 mL polypropylene container (φ: 40 mm; height: 30 mm), and 1.0 g of a sample to be measured was added to the container. The contents of the container were mixed and then accurately weighed. The resulting mixture was maintained in the container at 105° C. for 2 hours to remove volatile components therefrom, and further allowed to stand in a desiccator for 15 minutes, followed by measuring a mass thereof. The mass of the sample after removing the volatile components therefrom was regarded as a mass of solids in the sample. The solid content of the sample was calculated by dividing the mass of the solids by the mass of the sample initially added.

Production Example 1-1 (Production of Polymer Dispersant for Dispersing Titanium Oxide)

A 2 L-capacity glass reaction vessel equipped with dropping funnels was charged with 182 g of water, and the water in the flask was heated to 80° C. in a nitrogen atmosphere.

Then, in the nitrogen atmosphere, three dropping solutions, i.e., a monomer solution containing 314.1 g of methoxy polyethylene glycol monomethacrylate "NK ESTER M-230G" (tradename; average molar number of addition of ethyleneoxide (EO): n=23) available from Shin-Nakamura Chemical Co., Ltd., and 69.5 g of methacrylic acid as a dropping solution 1, 21.1 g of a 15%-conc. aqueous solution of 2-mercaptoethanol (polymerization chain transfer agent) as a dropping solution 2, and 84.1 g of a 6%-conc. aqueous solution of ammonium persulfate (polymerization initiator) as a dropping solution 3, were respectively gradually added dropwise at the same time into the reaction vessel over 90 minutes. After completion of the dropwise addition, the resulting mixed solution was aged at 80° C. for 1 hour.

Thereafter, the resulting reaction solution was cooled to 40° C., and then 26.9 g of a 48%-conc. sodium hydroxide aqueous solution was added thereto, and then 484.3 g of water was added to the resulting reaction mixture to adjust a solid content thereof to 40%, thereby obtaining a solution of a polymer dispersant (weight-average molecular weight of the polymer: 24,000).

Production Example 2-1 (Production of Titanium Oxide Dispersion)

A 1000 mL-capacity polyethylene bottle was charged with a solution prepared by mixing and dissolving 6 g of the polymer dispersant solution obtained in Production Example 1-1 in 2 g of ion-exchanged water, and further charged with 120 g of titanium dioxide "CR80" (rutile-type; Al/Si-treated titanium oxide; average primary particle size: 250 nm) available from Ishihara Sangyo Kaisha, Ltd., and 88 g of ion-exchanged water. Furthermore, 1476 g of 2 mmϕ zirconia beads were added to the polyethylene bottle, and the contents of the polyethylene bottle were subjected to dispersion treatment using a bench top-type pot mill pedestal available from AS ONE Corporation at 250 rpm for 10 hours.

After completion of the dispersion treatment, the resulting dispersion was filtered through a mesh filter to remove the zirconia beads from the dispersion, and water was added thereto to suitably control a solid content of the dispersion, thereby obtaining a titanium oxide dispersion containing titanium oxide particles having an average particle size of 325 nm (solid content: 51%).
(Production of Emulsion of Shell Polymer)

Production Example 3-1

(1) Production of Solution of Shell Polymer P1

Tert-butyl methacrylate and acrylic acid were mixed with each other in amounts of 75.8 parts and 24.2 parts, respectively, to prepare a monomer mixed solution. Five parts of methyl ethyl ketone (hereinafter also referred to merely as "MEK") and 2.5 parts of 2-mercaptoethanol (polymerization chain transfer agent) as well as 10% of the monomer mixed solution prepared above were charged into a reaction vessel and mixed with each other, and then an inside atmosphere of the reaction vessel was fully replaced with nitrogen gas.

On the other hand, a mixed solution prepared by mixing remaining 90% of the aforementioned monomer mixed solution, 2.25 parts of the aforementioned polymerization chain transfer agent, 75 parts of MEK and 2.0 parts of an azo-based radical polymerization initiator (2,2'-azobis(2,4-dimethyl valeronitrile)) available from FUJIFILM Wako Pure Chemical Corporation was charged into a dropping funnel. In a nitrogen atmosphere, the monomer mixed solution in the reaction vessel was heated to 77° C. while stirring, and then the mixed solution in the dropping funnel was added dropwise to the reaction vessel over 5 hours. After completion of the dropwise addition, a solution prepared by dissolving 0.5 part of the aforementioned polymerization initiator in 5 parts of MEK was added to the reaction vessel, and the resulting reaction solution was further reacted at 77° C. for 2 hours, and then MEK was finally added to the reaction vessel such that a solid content of the resulting reaction solution was adjusted to 55% to thereby obtain a solution of a shell polymer P1. The glass transition temperature (Tg), acid value and weight-average molecular weight of the polymer P1 were 106° C., 180 mgKOH/g and 16,000, respectively.

(2) Production of Emulsion EM1 of Shell Polymer P1

A 1000 mL separable flask was charged with 100 g of the solution of the polymer P1. While stirring the polymer solution using a stirring blade (at 200 rpm), a 5N sodium hydroxide aqueous solution was added dropwise to the flask so as to adjust a neutralization degree of the polymer to 60%, and then 372 g of ion-exchanged water was added dropwise to the flask at a dropping rate of 10 mL/min. Thereafter, the solvent and water were removed from the resulting reaction solution using an evaporator to thereby obtain an emulsion EM1 of the shell polymer having an average particle size of 15 nm and a resin solid content of 20% (acid value: 180 mgKOH/g; neutralization degree: 60%).

Production Examples 3-2 and 3-3

The same procedure as in Example 3-1 was repeated except that the composition of the shell portion resin monomer material was changed to those shown in Table 1, thereby obtaining an emulsion EM2 of a shell polymer P2 and an emulsion EM3 of a shell polymer P3 both having a resin solid content of 20%. The glass transition temperatures (Tg), acid values, weight-average molecular weights and neutralization degrees of the shell polymer P2 and the shell polymer P3 as well as the average particle sizes of particles in the emulsions of the shell polymers are shown in Table 1.

TABLE 1

| | | Emulsion of shell polymer | | | | | | | | |
|---|---|---|---|---|---|---|---|---|---|---|
| | | Shell portion resin monomer material | | | | | | | | |
| | | (Meth)acrylic acid ester (a-1) | | Ionic monomer (a-2) | | Shell polymer | | | | |
| Production Examples | Kind | Kind | Content of monomer (a-1) in shell portion resin monomer material (%) | Kind | Content of monomer (a-2) in shell portion resin monomer material (%) | Kind | Tg (° C.) | Acid value (mgKOH/g) | Weight-average molecular weight | Neutralization degree (mol %) | Average particle size (nm) |
| 3-1 | EM1 | tBMA | 75.8 | AA | 24.2 | P1 | 106 | 180 | 16000 | 60 | 15 |
| 3-2 | EM2 | tBMA | 67.8 | AA | 32.2 | P2 | 105 | 240 | 18500 | 60 | 10 |
| 3-3 | EM3 | CHMA | 75.8 | AA | 24.2 | P3 | 75 | 180 | 14000 | 60 | 15 |

Meanwhile, the details of the respective notations shown in Table 1 are as follows.

tBMA: Tert-butyl methacrylate

CHMA: Cyclohexyl methacrylate

AA: Acrylic acid

Example 1

(1) Production of Resin Particle Dispersion Containing Core/Shell-Type Resin Particles (A1)

A 1000 mL separable flask was charged with 200 g of the emulsion EM1 obtained in Production Example 3-1 and 12.2 g of ion-exchanged water. While stirring the contents of the flask (at 100 rpm), the flask was further charged with a core portion resin monomer material previously prepared by mixing 3.7 g of N-tert-butyl acrylamide (SP value: 20.2 $(J/cm^3)^{0.5}$) available from MCC Unitech Co., Ltd., and 33.5 g of isobutyl acrylate with each other. The contents of the flask were then heated to 75° C. while stirring.

Then, 9.3 g of a 4%-conc. aqueous solution of potassium persulfate (polymerization initiator) was gradually added dropwise into the flask over 90 minutes, After completion of the dropwise addition, the resulting reaction solution was aged at 80° C. for 1 hour. Thereafter, the resulting reaction solution was cooled to room temperature, thereby obtaining a resin particle dispersion of core/shell-type resin particles (A1) having a solid content of 30%. The glass transition temperature (Tg) of the core portion resin, the acid value of the resin particles (A1) and the mass ratio of the core portion resin to the shell portion resin [core portion resin/shell portion resin] are shown in Table 2.

(2) Production of Aqueous Ink 1

The thus obtained resin particle dispersion of the core/shell-type resin particles (A1) was weighed in an amount of 23.3 g, and mixed with 30 g of the titanium oxide dispersion obtained in Production Example 2-1, 5 g of diethylene glycol monoisobutyl ether, 15 g of 1,2-propanediol, 1 g of an acetylene glycol-based surfactant "SURFYNOL 440" (an ethyleneoxide (3.5 mol) adduct of 2,4,7,9-tetramethyl-5-decyne-4,7-diol) available from Nissin Chemical Industry Co., Ltd., 1 g of a polyether-modified silicone-based surfactant "KF6011" (PEG-11 methyl ether dimethicone) available from Shin-Etsu Chemical Co., Ltd., and 24.7 g of ion-exchanged water, thereby obtaining an aqueous ink 1.

Example 2

(1) Production of Resin Particle Dispersion Containing Core/Shell-Type Resin Particles (A2)

The same procedure for production of the resin particle dispersion as in Example 1 was repeated except that the emulsion EM1 was replaced with the emulsion EM3, thereby obtaining a resin particle dispersion of core/shell-type resin particles (A2) having a solid content of 30%.

(2) Production of Aqueous Ink 2

The same procedure for production of the aqueous ink as in Example 1 was repeated except for using the thus obtained resin particle dispersion of the core/shell-type resin particles (A2), thereby obtaining an aqueous ink 2.

Example 3

(1) Production of Resin Particle Dispersion Containing Core/Shell-Type Resin Particles (A3)

The same procedure for production of the resin particle dispersion as in Example 1 was repeated except that N-tert-butyl acrylamide as the core portion resin monomer material was replaced with N-tert-octyl acrylamide (SP value: 17.9 $(J/cm^3)^{0.5}$) available from MCC Unitech Co. Ltd., thereby obtaining a resin particle dispersion of core/shell-type resin particles (A3) having a solid content of 30%.

(2) Production of Aqueous Ink 3

The same procedure for production of the aqueous ink as in Example 1 was repeated except for using the thus obtained resin particle dispersion of the core/shell-type resin particles (A3), thereby obtaining an aqueous ink 3.

Example 4

(1) Production of Resin Particle Dispersion Containing Core/Shell-Type Resin Particles (A4)

A 1000 mL separable flask was charged with 200 g of the emulsion EM1 obtained in Production Example 3-1 and 91.0 g of ion-exchanged water. While stirring the contents of the flask (at 100 rpm), the flask was further charged with a core portion resin monomer material previously prepared by mixing 7.4 g of N-tert-octyl acrylamide and 67.0 g of isobutyl acrylate with each other. The contents of the flask were then heated to 75° C. while stirring.

Then; 18.6 g of a 4%-conc. aqueous solution of potassium persulfate was gradually added dropwise into the flask over 90 minutes. After completion of the dropwise addition, the resulting reaction solution was aged at 80° C. for 1 hour, Thereafter, the resulting reaction solution was cooled to room temperature, thereby obtaining a resin particle dispersion of core/shell-type resin particles (A4) having a solid content of 30%, (2) Production of Aqueous Ink 4

The same procedure for production of the aqueous ink as in Example 1 was repeated except for using the thus obtained resin particle dispersion of the core/shell-type resin particles (A4), thereby obtaining an aqueous ink 4.

Example 5

(1) Production of Resin Particle Dispersion Containing Core/Shell-Type Resin Particles (A5)

A 1000 mL separable flask was charged with 200 g of the emulsion EM2 obtained in Production Example 3-2 and 86.8 g of ion-exchanged water. While stirring the contents of the flask (at 100 rpm), the flask was further charged with a mixture previously prepared by mixing 7.3 g of N-tert-octyl acrylamide and 65.3 g of isobutyl acrylate with each other. The contents of the flask were then heated to 75° C. while stirring.

Then, 18.1 g of a 4%-conc. aqueous solution of potassium persulfate was gradually added dropwise into the flask over 90 minutes. After completion of the dropwise addition, the resulting reaction solution was aged at 80° C. for 1 hour. Thereafter, the resulting reaction solution was cooled to room temperature, thereby obtaining a resin particle dispersion of core/shell-type resin particles (A5) having a solid content of 30%.

(2) Production of Aqueous Ink 5

The same procedure for production of the aqueous ink as in Example 1 was repeated except for using the thus obtained resin particle dispersion of the core/shell-type resin particles (A5), thereby obtaining an aqueous ink 5.

Example 6

(1) Production of Resin Particle Dispersion Containing Core/Shell-Type Resin Particles (A6)

A 1000 mL separable flask was charged with 200 g of the emulsion EM1 obtained in Production Example 3-1 and 12.2 g of ion-exchanged water. While stirring the contents of the flask (at 100 rpm), the flask was further charged with a mixture previously prepared by mixing 1.9 g of tert-butyl acrylamide and 35.4 g of isobutyl acrylate with each other. The contents of the flask were then heated to 75' C while stirring.

Then, 9.3 g of a 4%-conc. aqueous solution of potassium persulfate was gradually added dropwise into the flask over 90 minutes. After completion of the dropwise addition, the resulting reaction solution was aged at 80° C. for 1 hour. Thereafter, the resulting reaction solution was cooled to room temperature, thereby obtaining a resin particle dispersion of core/shell-type resin particles (AG) having a solid content of 30%.

(2) Production of Aqueous Ink 6

The same procedure for production of the aqueous ink as in Example 1 was repeated except for using the thus obtained resin particle dispersion of the core/shell-type resin particles (AG), thereby obtaining an aqueous ink 6.

Comparative Example 1

(2) Production of Aqueous ink C1

The same procedure for production of the aqueous ink as in Example 1 was repeated except that 23.3 g of the resin particle dispersion of the core/shell-type resin particles (A1) was replaced with 35.0 g of the emulsion EM1 obtained in Production Example 3-1, and the amount of the ion-exchanged water was changed to 13.0 g, thereby obtaining an aqueous ink C1.

Comparative Example 2

(1) Production of Resin Particle Dispersion Containing Core/Shell-Type Resin Particles (AC2)

The same procedure for production of the resin particle dispersion as in Example 1 was repeated except that 37.5 g of isobutyl acrylate solely was used as the core portion resin monomer material without using N-tert-butyl acrylamide therein, thereby obtaining a resin particle dispersion of core/shell-type resin particles (AC2) having a solid content of 30%.

(2) Production of Aqueous Ink. C2

The same procedure for production of the aqueous ink as in Example 1 was repeated except for using the thus obtained resin particle dispersion of the core/shell-type resin particles (AC2), thereby obtaining an aqueous ink C2.

Comparative Example 3

(1) Production of Resin Particle Dispersion Containing Core/Shell-Type Resin Particles (AC3)

The same procedure for production of the resin particle dispersion as in Example 1 was repeated except that N-tert-butyl acrylamide as the core portion resin monomer material was replaced with diacetone acrylamide (SP value: 22.0 $(J/cm^3)^{0.5}$) available from FUJIFILM Wako Pure Chemical Corporation. However, the reaction system underwent gelation, so that it was not possible to obtain core/shell-type resin particles.

Comparative Example 4

(1) Production of Resin Particle Dispersion Containing Core/Shell-Type Resin Particles (AC4)

A 1000 mL separable flask was charged with 200 g of the emulsion EM1 obtained in Production Example 3-1 and 12.2 g of ion-exchanged water. While stirring the contents of the flask (at 100 rpm), the flask was further charged with a core portion resin monomer material previously prepared by mixing 1.2 g of N-tert-butyl acrylamide and 36.0 g of isobutyl acrylate with each other. The contents of the flask were then heated to 75° C. while stirring.

Then, 9.3 g of a 4%-conc. aqueous solution of potassium persulfate was gradually added dropwise into the flask over 90 minutes. After completion of the dropwise addition, the resulting reaction solution was aged at 80° C. for 1 hour. Thereafter, the resulting reaction solution was cooled to room temperature, thereby obtaining a resin particle dispersion of core/shell-type resin particles (AC4) having a solid content of 30%.

(2) Production of Aqueous

The same procedure for production of the aqueous ink as in Example 1 was repeated except for using the thus obtained resin particle dispersion of the core/shell-type resin particles (AC4), thereby obtaining an aqueous ink C4.

[Evaluation]

(Evaluation of Substrate-Adhesion Properties)

(1) Preparation of Printed Material

Using a gravure proof press "K PRINTING PROOFER" available from RK Print Coat Instruments Ltd., and a honeycomb screen having 250 screen lines and a depth of 10 μm as a gravure printing plate, the respective aqueous inks obtained in the aforementioned Examples and Comparative Examples were used to conduct printing on each of the following corona discharge-treated OPP films as a printing substrate at a printing speed of 15 m/min, and then dried at 60° C. for 1 hour, thereby obtaining a gravure printed material.

(Corona Discharge-Treated OPP Films)

OPP #50: "FOS-AQ, #50" (thickness: 50 μm) available from Futamura Chemical Co., Ltd.

OPP #20: "FOR-AQ, #20" (thickness: 20 μm) available from Futamura Chemical Co., Ltd.

(2) Tape Peel Test

Under the environmental condition of 25° C., an adhesive surface of a cellophane tape having a width of 18 mm available from Nichiban Co., Ltd., was attached onto a 100% density portion of a printed image formed on the gravure printed material, and strongly pressed and adhered thereonto by a palm of hand. Then, the tape was peeled off as quickly as possible, and the surface of the printed material was observed to measure an area ratio of the printed image portion peeled off with the tape and evaluate substrate-adhesion properties of the respective inks from the thus measured area ratio according to the following evaluation ratings. The results are shown in Table 2.

(Evaluation Ratings)

A: No peeling of the printed image occurred.

B: Slight peeling of the printed image occurred (area ratio of printed image portion peeled off: less than 10%).

C: Some peeling of the printed image occurred (area ratio of printed image portion peeled off: not less than 10% and less than 30%).

D: Peeling of the printed image occurred (area ratio of printed image portion peeled off not less than 30% and less than 40%).

E: Severe peeling of the printed image occurred (area ratio of printed image portion peeled off: not less than 40%).

When the evaluation rating is Rank A, B or C (i.e., when the area ratio of the printed image portion peeled off is less than 30%), the ink was practically usable in the applications in which the printed material suffered from no rubbing, and when the evaluation rating is Rank A or B (i.e., when the area ratio of the printed image portion peeled off is less than 10%), the ink was practically usable even in the applications in which the printed material suffered from rubbing.

Meanwhile, the details of the respective notations shown in Table 2 are as follows.

tBuAAm: N-tert-butyl acrylamide
tOAAm: N-tert-octyl acrylamide
iBA: Isobutyl acrylate
DAAm: Diacetone acrylamide

TABLE 2-1

| | Core portion resin monomer material | | | | | |
|---|---|---|---|---|---|---|
| | (Meth)acrylamide-based monomer (b-1) | | | (Meth)acrylic acid ester (b-2) | | |
| | Kind | SP value $[(J/cm^3)^{0.5}]$ | Content of monomer (b-1) in core portion resin monomer material (%) | Kind | Content of monomer (b-2) in core portion resin monomer material (%) | Emulsion of shell polymer Kind |
| Example 1 | tBuAAm | 20.2 | 10 | iBA | 90 | EM1 |
| Example 2 | tBuAAm | 20.2 | 10 | iBA | 90 | EM3 |
| Example 3 | tOAAm | 17.9 | 10 | iBA | 90 | EM1 |
| Example 4 | tOAAm | 17.9 | 10 | iBA | 90 | EM1 |
| Example 5 | tOAAm | 17.9 | 10 | iBA | 90 | EM2 |
| Example 6 | tBuAAm | 20.2 | 5 | iBA | 95 | EM1 |
| Comparative Example 1 | — | — | — | — | — | — |
| Comparative Example 2 | — | — | 0 | iBA | 100 | EM1 |
| Comparative Example 3 | (DAAm) | (22.0) | 10 | iBA | 90 | EM1 |
| Comparative Example 4 | tBuAAm | 20.2 | 3 | iBA | 97 | EM1 |

| | Core/shell-type resin particles (A) | | | | Evaluation | |
|---|---|---|---|---|---|---|
| | Kind | Tg of core portion resin (° C.) | Acid value of resin particles (A) (mgKOH/g) | Mass ratio between contents of respective components in resin particles (A) [(core portion resin)/(shell portion resin)] | Aqueous ink Kind | Substrate-adhesion properties |
| | | | | | | OPP #20 / OPP #50 |
| Example 1 | A1 | −5.2 | 90 | 1.0 | 1 | A / A |
| Example 2 | A2 | −5.2 | 90 | 1.0 | 2 | A / A |
| Example 3 | A3 | Not higher than room temperature | 90 | 1.0 | 3 | A / A |
| Example 4 | A4 | Not higher than room temperature | 60 | 2.0 | 4 | A / A |
| Example 5 | A5 | Not higher than room temperature | 80 | 2.0 | 5 | A / A |
| Example 6 | A6 | −12.6 | 90 | 1.0 | 6 | B / A |
| Comparative Example 1 | (EM1) | — | — | — | C1 | E / D |
| Comparative Example 2 | AC2 | −20.0 | 90 | 1.0 | C2 | D / A |
| Comparative Example 3 | | | | *1 | | |
| Comparative Example 4 | AC4 | −15.6 | 90 | 1.0 | C4 | D / A |

Note *1:
In Comparative Example 3, the reaction system underwent gelation upon production of the core/shell-type resin particles, so that it was not possible to obtain the core/shell-type resin particles and then conduct evaluation thereof.

From Table 2, it was confirmed that the aqueous inks obtained in Examples 1 to 6 were excellent in substrate-adhesion properties as compared to the aqueous inks obtained in Comparative Examples 1, 2 and 4.

The aqueous ink obtained in Comparative Example 1 in which the emulsion of the resin particles having no core/shell structure was used was deteriorated in substrate-adhesion properties irrespective of the thickness of the resin film used therein.

The aqueous ink obtained in Comparative Example 2 in which the core portion resin contained no constitutional unit derived from the (meth)acrylamide-based monomer was deteriorated in substrate-adhesion properties against the resin film having a small thickness.

In Comparative Example 3, since the SP value of the (meth)acrylamide-based monomer that was contained as a monomer component in the core portion resin was more than 21.0 $(J/cm^3)^{0.5}$, the reaction system underwent gelation upon production of the resin particles, so that it was not possible to obtain core/shell-type resin particles.

In Comparative Example 4, since the content of the constitutional unit derived from the (meth)acrylamide-based monomer in the core portion resin was less than 5% by mass, the resulting ink was deteriorated in substrate-adhesion properties against the resin film having a small thickness.

The invention claimed is:
1. A resin particle dispersion, comprising core/shell-type resin particles (A), a pigment, and water, wherein:

a content of the core/shell-type resin particles (A) is not less than 15% by mass in the resin particle dispersion;

a shell portion resin of the core/shell-type resin particles (A) comprises a constitutional unit derived from a (meth)acrylic acid ester (a-1) comprising a hydrocarbon group having not less than 4 and not more than 8 carbon atoms;

a core portion resin of the core/shell-type resin particles (A) comprises a constitutional unit derived from a (meth)acrylamide-based monomer (b-1) whose solubility parameter lies within the range of not less than 17.0 $(J/cm^3)^{0.5}$ and not more than 21.0 $(J/cm^3)^{0.5}$ in an amount of not less than 5% by mass;

a glass transition temperature of the core portion resin is not higher than 50° C.;

an acid value of the core portion resin is not more than 30 mgKOH/g;

an acid value of the shell portion resin is not less than 120 mgKOH/g; and an acid value of the core/shell-type resin particles (A) is not less than 50 mgKOH/g and not more than 100 mgKOH/g.

2. The resin particle dispersion according to claim 1, wherein the core portion resin further comprises a constitutional unit derived from a (meth)acrylic acid ester (b-2) comprising a hydrocarbon group having not less than 2 and not more than 18 carbon atoms.

3. The resin particle dispersion according to claim 2, wherein the hydrocarbon group having not less than 2 and not more than 18 carbon atoms in the (meth)acrylic acid ester (b-2) is at least one group selected from the group consisting of an alkyl group having not less than 3 and not more than 12 carbon atoms and a benzyl group.

4. The resin particle dispersion according to claim 1, wherein the shell portion resin further comprises a constitutional unit derived from an ionic monomer (a-2).

5. The resin particle dispersion according to claim 1, wherein a content of the constitutional unit derived from the (meth)acrylic acid ester (a-1) in the shell portion resin is not less than 40% by mass and not more than 95% by mass.

6. The resin particle dispersion according to claim 1, wherein an acid value of the shell portion resin is not less than 120 mgKOH/g and not more than 280 mgKOH/g.

7. The resin particle dispersion according to claim 1, wherein a mass ratio of a content of the core portion resin to a content of the shell portion resin [core portion resin/shell portion resin] in the core/shell-type resin particles (A) is not less than 1 and not more than 2.5.

8. The resin particle dispersion according to claim 1, wherein a content of water in the resin particle dispersion is not less than 30% by mass and not more than 80% by mass.

9. The resin particle dispersion according to claim 1, wherein the pigment is a white pigment.

10. The resin particle dispersion according to claim 1, which is used as an aqueous ink for gravure printing.

11. A process for producing the resin particle dispersion according to claim 1, the process comprising:
subjecting a core portion resin monomer material for forming the core portion resin to a polymerization reaction in the presence of an emulsion of a shell polymer forming the shell portion resin to form the core/shell-type resin particles (A) and thereby obtain the resin particle dispersion.

12. A printing method, comprising:
printing characters or images on a resin film as a printing substrate using the resin particle dispersion according to claim 1.

13. The printing method according to claim 12, wherein the printing substrate has a thickness of not less than 5 μm and not more than 100 μm.

14. The resin particle dispersion according to claim 1, which is used as an aqueous ink for ink-jet printing.

15. The resin particle dispersion according to claim 2, wherein the (meth)acrylic acid ester (b-2) is at least one compound selected from the group consisting of isobutyl (meth)acrylate, sec-butyl (meth)acrylate, tert-butyl (meth)acrylate, 2-ethylhexyl (meth)acrylate, and benzyl (meth)acrylate.

16. The resin particle dispersion according to claim 2, wherein a total content of the constitutional units derived from the (meth)acrylamide-based monomer (b-1) and the (meth)acrylic acid ester (b-2) in the whole constitutional units constituting the core portion resin is not less than 70% by mass and not more than 100% by mass.

17. The resin particle dispersion according to claim 2, wherein the mass ratio of a content of the constitutional unit derived from (meth)acrylamide-based monomer (b-1) to a content of the constitutional unit derived from the (meth)acrylic acid ester (b-2) in the whole constitutional units constituting the core portion resin
[(meth)acrylamide-based monomer (b-1)/(meth)acrylic acid ester (b-2)]
is not less than 0.01 and not more than 0.5.

18. The resin particle dispersion according to claim 4, wherein a content of the constitutional unit derived from the ionic monomer (a-2) in the shell portion resin is not less than 5% by mass and not more than 60% by mass.

19. The resin particle dispersion according to claim 4, wherein a total content of the constitutional units derived from the (meth)acrylic acid ester (a-1) and the ionic monomer (a-2) in the shell portion resin is not less than 70% by mass and not more than 100% by mass.

* * * * *